(12) United States Patent
Carapella et al.

(10) Patent No.: US 10,976,512 B2
(45) Date of Patent: Apr. 13, 2021

(54) HOUSE BOX WITH MOUNTING SURFACE FOR MOUNTED ACCESS

(71) Applicant: PPC BROADBAND, INC., East Syracuse, NY (US)

(72) Inventors: Peter A. Carapella, Fayetteville, NY (US); William L. Crawford, Syracuse, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 15/819,989

(22) Filed: Nov. 21, 2017

(65) Prior Publication Data

US 2018/0120527 A1    May 3, 2018

Related U.S. Application Data

(63) Continuation-in-part of application No. 14/964,568, filed on Dec. 9, 2015, now Pat. No. 9,882,362, which
(Continued)

(51) Int. Cl.
*G02B 6/00* (2006.01)
*G02B 6/44* (2006.01)
*H02G 3/08* (2006.01)

(52) U.S. Cl.
CPC ......... *G02B 6/4447* (2013.01); *G02B 6/4441* (2013.01); *G02B 6/4457* (2013.01);
(Continued)

(58) Field of Classification Search
CPC .. G02B 6/4447; G02B 6/4471; G02B 6/4441; G02B 6/4457; G02B 6/445; G02B 6/4478; G02B 6/4448; H02G 3/081; H02G 3/086
(Continued)

(56) References Cited

U.S. PATENT DOCUMENTS 4,850,014 A    7/1989    Gillis et al.
4,998,894 A    3/1991    Gronvall
(Continued)

FOREIGN PATENT DOCUMENTS

DE    19740246 C1    2/1999
WO    0165295 A1    9/2001
(Continued)

OTHER PUBLICATIONS

Dec. 11, 2015 International Search Report issued in International Application No. PCT/US2015/051802.
(Continued)

*Primary Examiner* — Kaveh C Kianni
*Assistant Examiner* — Hung Q Lam
(74) *Attorney, Agent, or Firm* — MH2 Technology Law Group LLP

(57) ABSTRACT

An enclosable box for housing components from more than one telecommunications systems including a first housing portion, a second housing portion, a box mounting hinge that connects the first housing portion and the second housing portion, an internal telecommunications component compartment panel, a compartment panel mounting hinge that connects the internal telecommunications component compartment with one of the first and second housing portions. The compartment panel mounting hinge may be configured to allow the compartment panel to open and close an internal compartment or cavity that is large enough to enclose at least a first telecommunications systems component. The back wall of the first housing portion may include a component platform that is either fixed or allowed to pivot into a configuration such that the component platform is tilted away from the base member.

27 Claims, 18 Drawing Sheets

Related U.S. Application Data is a continuation-in-part of application No. 14/863,427, filed on Sep. 23, 2015, now Pat. No. 9,952,397.

(60) Provisional application No. 62/425,046, filed on Nov. 21, 2016, provisional application No. 62/089,587, filed on Dec. 9, 2014, provisional application No. 62/053,850, filed on Sep. 23, 2014.

(52) U.S. Cl.
CPC .......... *G02B 6/4471* (2013.01); *H02G 3/081* (2013.01); *H02G 3/086* (2013.01); *G02B 6/445* (2013.01); *G02B 6/4448* (2013.01); *G02B 6/4478* (2013.01)

(58) Field of Classification Search
USPC ........................................................ 385/135
See application file for complete search history.

(56) References Cited

U.S. PATENT DOCUMENTS

| | | | |
|---|---|---|---|
| 5,029,958 A | 7/1991 | Hodge et al. | |
| 5,274,731 A | 12/1993 | White | |
| 5,420,958 A | 5/1995 | Henson et al. | |
| 5,668,911 A | 9/1997 | Debortoli | |
| 5,721,396 A | 2/1998 | Daoud | |
| 5,892,872 A | 4/1999 | Glover | |
| 6,242,697 B1 | 6/2001 | Gerken et al. | |
| 6,264,056 B1 | 7/2001 | King | |
| 6,265,670 B1 | 7/2001 | Duesterhoeft et al. | |
| 6,282,285 B1 | 8/2001 | Daoud | |
| 6,427,045 B1 | 7/2002 | Matthes et al. | |
| 6,661,961 B1 * | 12/2003 | Allen ................... G02B 6/3831 385/135 | |
| 7,198,409 B2 | 4/2007 | Smith et al. | |
| 7,233,731 B2 | 6/2007 | Solheid et al. | |
| 7,349,616 B1 | 3/2008 | Castonguay et al. | |
| 7,397,997 B2 | 7/2008 | Ferris et al. | |
| 7,660,409 B1 | 2/2010 | Czerwiec et al. | |
| 7,672,450 B2 | 3/2010 | Paulsen | |
| 7,737,360 B2 | 6/2010 | Wiemeyer et al. | |
| 7,751,675 B2 | 7/2010 | Holmberg et al. | |
| 7,809,233 B2 | 10/2010 | Smith et al. | |
| 7,809,234 B2 | 10/2010 | Smith et al. | |
| 7,816,602 B2 | 10/2010 | Landry et al. | |
| RE42,258 E | 3/2011 | Thompson et al. | |
| 8,020,813 B1 | 9/2011 | Clark et al. | |
| 8,244,090 B2 | 8/2012 | Kutsuzawa | |
| 8,254,741 B2 | 8/2012 | Imaizumi et al. | |
| 8,263,861 B2 | 9/2012 | Landry et al. | |
| 8,705,929 B2 | 4/2014 | Kowalczyk et al. | |
| 8,811,791 B2 | 8/2014 | Solheid et al. | |
| 8,938,147 B2 | 1/2015 | Krampotich et al. | |
| 9,008,483 B2 | 4/2015 | Larsson et al. | |
| 9,122,021 B2 | 9/2015 | Elenbaas et al. | |
| 9,151,922 B2 | 10/2015 | Claessens et al. | |
| 9,201,206 B2 | 12/2015 | Smith et al. | |
| 2005/0276562 A1 | 12/2005 | Battey et al. | |
| 2006/0067522 A1 | 3/2006 | Paulsen | |
| 2006/0153516 A1 | 7/2006 | Napiorkowski et al. | |
| 2006/0269216 A1 | 11/2006 | Wiemeyer et al. | |
| 2007/0272440 A1 | 11/2007 | Grunwald et al. | |
| 2009/0202214 A1 | 8/2009 | Holmberg et al. | |
| 2009/0238531 A1 * | 9/2009 | Holmberg ............ G02B 6/3897 385/135 | |
| 2009/0310927 A1 | 12/2009 | Riggsby et al. | |
| 2009/0314907 A1 | 12/2009 | Romerein et al. | |
| 2010/0074578 A1 | 3/2010 | Imaizumi et al. | |
| 2010/0329622 A1 | 12/2010 | Kutsuzawa | |
| 2011/0013875 A1 | 1/2011 | Bran de Leon et al. | |
| 2011/0242735 A1 | 10/2011 | Landry et al. | |
| 2011/0305422 A1 | 12/2011 | Thompson et al. | |
| 2012/0248112 A1 | 10/2012 | Amidon et al. | |
| 2012/0321268 A1 | 12/2012 | Claessens et al. | |
| 2014/0023334 A1 | 1/2014 | Larsson et al. | |

FOREIGN PATENT DOCUMENTS

| | | |
|---|---|---|
| WO | 02071123 A1 | 9/2002 |
| WO | 2005045487 A2 | 5/2005 |
| WO | 2005045487 A3 | 8/2005 |
| WO | 2012138856 A1 | 10/2012 |

OTHER PUBLICATIONS

Jul. 1, 2016 Office Action Issued in U.S. Appl. No. 14/863,427.
Feb. 5, 2016 Search Report issued in International Application No. PCT/US2015/064851.
Feb. 18, 2016 Office Action Issued in U.S. Appl. No. 14/964,568.
Oct. 21, 2016 Office Action Issued in U.S. Appl. No. 14/964,568.
FieldSmart Fiber Scalability Center (FSC) Installation Manual, http://www.clearfieldconnection.com/products/cabinets/pon-cabinets.html, pp. 1-60, 2014.
FieldSmart Fiber Scalability Center (FSC) PON Cabinets Data Sheet, http://www.clearfieldconnection.com/products/cabinets/pon-cabinets.html, pp. 1-6.
Clearfield Clearview Blue Cassette Data Sheets, http://www.clearfieldconnection.com/products/cassettes.html, pp. 1-4.
Clearview Classic Cassette Data Sheets, http://www.clearfieldconnection.com/products/cassettes.html, pp. 1-4.
Mar. 28, 2017 Search Report issued in International Application No. PCT/US2015/051802.

* cited by examiner

US 10,976,512 B2

HOUSE BOX WITH MOUNTING SURFACE FOR MOUNTED ACCESS

This is a U.S. Non-Provisional Application that is a U.S. Continuation-In-Part Application that claims priority to U.S. Non-Provisional application Ser. No. 14/964,568 filed Dec. 9, 2015, pending, which: (i) claims the benefit of priority of U.S. Provisional Application No. 62/089,587 filed Dec. 9, 2014, and (ii) is a U.S. Continuation-In-Part Application that claims priority to U.S. application Ser. No. 14/863,427 filed Sep. 23, 2015, pending, which claims the benefit of priority of U.S. Provisional Application No. 62/053,850 filed Sep. 23, 2014. This application also claims priority to U.S. Provisional Application No. 62/425,046 filed Nov. 21, 2016. The disclosures of the prior applications are hereby incorporated by reference herein in their entirety.

BACKGROUND

Cable and/or Internet service providers may offer a variety of transmission technologies (e.g., radio, telephone, coaxial cable, twisted pair, fiber optic, broadband, wireless broadband, and satellite communications). Generally speaking, with the exception of antenna-based systems, these telecommunications system services are routed via a signal-carrying cable (e.g., coaxial) to a subscriber's residence or office. Before entering a subscriber's residence/office, such cables generally pass through a secure enclosure (i.e., "house box," or "entry box"). During, for example, residential installation of cable service, the house box provides access to certain components necessary for the installation of the cable service (e.g., coaxial male and female connectors that must be connected, a splitter (providing service connection endpoints to multiple locations within the residence/office), and/or an amplifier (boosting a signal being conveyed to a distal location within the residence/office).

House boxes configured for telecommunications system components are generally known. However, the majority of conventional house boxes are configured to house only telecommunications system components made by and/or for a specific manufacturer. Thus, with a telecommunications system installation that requires telecommunications system components made by and/or for different manufacturers, service providers may need to place separate boxes on, for example, a homeowner's (residential) property to accommodate the different types of telecommunications system components of different respective manufacturers. The use of multiple component installation (house) boxes on a subscriber's residential property is undesirable both technically and esthetically.

Recently, some manufacturers have provided a large-size custom-built box on demand, but, as discussed above, conventional house boxes are silent regarding providing access to certain components (e.g., RF equipment) while preventing access to (or hiding) fiber optics components. For example, a service provider may desire to prevent access to fiber components by individuals who do not have the requisite training to access those components (e.g., an untrained installation technician, residents who are attempting to install cable service on their own).

In a conventional telecommunications service installation in a conventional house box, the technician must possess requisite knowledge of multiple systems each requiring a different skill or proficiency level. For example, an installation procedure may require the combined proficiency in each of fiber optic, coaxial and data communications systems standards/requirements. To address these requirements, a service provider may try training all technicians to the highest possible skill level (ensuring each technician an installation can be performed by a single technician). However, this training plan is inefficient and training everyone costs time and money. Alternatively, the service provider may try and manage technicians such that the "right" technician for the task at hand is delegated for the task. While this practice may result in greater efficiency than the train everyone approach, it may also adversely impact performance (e.g., if the installation is performed incorrectly). With respect to the latter, a technician installing coaxial cable may be unfamiliar with the intricacies of fiber optic cable (e.g., such as a need to maintain a minimum permissible bend radius to maintain signal integrity). In fiber optic cables, the minimum permissible bend radius is very important. In this respect, inadvertently bending a fiber optic cable beyond its permissible bend radius can result in a loss of signal performance.

Accordingly, conventional secure enclosures do not: (i) adequately segregate portions of the enclosure, each portion individually housing a fiber optic or coaxial cable component, (ii) maintain proper fiber management, and (iii) provide laser safety. As a consequence, service providers place the equipment in separate/distinct/secure entry enclosures which are both technically inadequate and aesthetically unpleasing/unappealing.

Therefore, there is a need to overcome, or otherwise lessen the effects of, the disadvantages and shortcomings described above. For example, utilizing a telecommunications box according to the disclosure has, as an example, the advantage of allowing for error free installation of components related to a second telecommunications system (e.g., RF equipment, coaxial splitters) in an enclosable box that provides a hidden, nested compartment for equipment related to a first telecommunications system (e.g., fiber components), thus protecting the first telecommunications system from harm, even if inadvertent (e.g., by an individual (service provider technician) who does not possess fiber optics handling training).

Furthermore, it may be necessary to field test the first telecommunications system component to determine whether the first telecommunications system component is working properly. However, in a preferred embodiment, the house box may be configured so as to be compact and only provide a negligible amount of clearance (e.g., 1-5 inches) beyond the component and/or component cables that the housing portion is configured to house. Thus, there is a problem that a testing probe having a length greater than the clearance may not be able to connect to an optical port of the first telecommunications component in the hidden compartment. Therefore, there is a need to overcome, or otherwise lessen the effects of, the compact configuration of the house box while performing testing on the first telecommunications system component in the hidden compartment.

SUMMARY

The present disclosure relates to the above-mentioned telecommunications technologies. In particular, enclosable house boxes and methods for installing, testing, inspecting and cleaning telecommunications components. Installation of telecommunications components includes installation, removal, and modification of telecommunications components. Testing includes at least connecting a probe to a port of a telecommunications component to determine whether the telecommunications component is working properly or not.

In particular, the disclosure provides a universal multi-purpose enclosure or enclosable house box for one or more types of telecommunications system components. For example, a multi-purpose box that provides both a first type of telecommunications system component and a second type of telecommunications system components. The second type of telecommunications system component may be different than the first telecommunications system component. The first type of telecommunications system component may be a fiber optic system component. The second type of telecommunications system component may be an RF system component. The multi-purpose house box may be configured to have an internal cavity that is large enough to allow the service provider flexibility in choosing and exchanging various components of various telecommunications systems of a variety of sizes (e.g., different telecommunications systems types, styles, and manufacturers), but may also be compact in size in this context. For example, the volume in the internal cavity may be not much bigger than the two different types of components. For example, the internal cavity may be configured to house one of each of two types telecommunications components, but not big enough to house an additional one of one of the two types of telecommunications components. That is, the cavity may be configured to house two telecommunications components, and the respective cables, with a predetermined amount of clearance, but not much else, thereby minimizing the footprint at the residence side.

That is, the multi-purpose house box may be configured to house a number of different telecommunications components, while only including a nominal amount of clearance outside of those components. For example, a nominal amount of clearance could be enough clearance to provide flexibility in choosing the specific type of telecommunications component. For example, a nominal amount of clearance may be 2-5 inches. However, it may be desired for the nominal amount of clearance to be larger (e.g., to house additional objects/equipment) or smaller (to be more compact).

The present disclosure shows an embodiment including an easily accessible RF equipment (coaxial cable) telecommunications system, and a less accessible fiber telecommunications system component. It should be appreciated that it may be desirable to configure the house box to house different types/sizes of telecommunications equipment. As such, the length/height/depth of the largest currently-available type of fiber optics component could be used, in conjunction with the nominal amount of clearance, to determine the preferred dimensions of the house box. For example, in this embodiment, the length/height/depth of the largest currently available RF component and fiber optics component, respectively, could be used with the nominal amount of clearance to determine the dimensions of the house box.

In this embodiment, the universal house box may be configured to ensure safe and effective fiber handling (first telecommunications system), while allowing easy access for RF network changes and modifications (second telecommunications system). To do such, the enclosable box may provide an internal compartment panel that may enclose, protect, and limit access to a first type of telecommunications system, such as, a fiber component, thereby minimizing inadvertent human error directed at/received by the second type of telecommunications system. In addition, a compartment panel and universal house box may be configured such that a second type of telecommunications system (e.g., non-fiber components such as RF components) may be provided in the space remaining within the box outside of the compartment created by/underneath the panel. Further, an upper surface of the panel may be configured to be mountable/attachable with a second communication system type component (e.g., a splitter or amplifier for an RF communication system). Similarly, the nominal amount of clearance may be used to determine the dimensions of the house box and the compartment panel, respectively, to provide housing for the two different types of telecommunications components.

With the universal, multi-purpose house box, a telecommunications service provider may use only one box (instead of two boxes) to house both a first telecommunications system component (e.g., an RF communication system) and a second type of telecommunications system component (e.g., a fiber optic communication system).

House boxes according to the disclosure allow the telecommunications service provider to be more efficient with human resources by protecting (via access prevention) the first (fiber) communication system from untrained/undertrained installation technicians whose job function/task may be related to the second communication system only. Thus, the service provider may have greater labor efficiency, for example, by allowing untrained technicians to work on segregated fiber boxes.

One or more aspects of the disclosure provide an access control device comprising: an optical fiber configuration base member configured to be coupled to an optical fiber component and to arrange the optical fiber component so as to create a peripheral optical fiber cable path around at least a portion of the optical fiber component, and a component platform configured to be pivotally connected to the optical fiber configuration base member, the component platform being configured to have the optical fiber component mounted thereto, wherein the component platform is connected to the optical fiber configuration base member via a connection portion that permits the component platform to pivot to a configuration such that the component platform is tilted away from the base member. The access control device may further include the peripheral optical fiber cable path is configured to receive slack optical fiber cable, encircle the slack optical fiber cable around a portion of the optical fiber component, and shape the slack optical fiber cable so as to be connected to the optical fiber component while preventing the slack optical fiber cable from being less than a minimum optical fiber cable bend radius of the slack optical fiber cable when the slack optical fiber cable is connected to the optical fiber component. The slack fiber cable may wrap around at least three quarters of the optical fiber component, which is a fiber optic converter, within the optical fiber configuration base member. The access control device may further include wrap guides configured to extend from the optical fiber configuration base member so as to control the bend radius of the slack optical fiber cable stored in the optical fiber configuration base member. The access control device may further include the optical fiber configuration base member has an outer rectangular shape and an inner rectangular shape, and the outer rectangular shape is configured to match and fit within a housing.

The access control device may further include wherein the component platform is configured to pivot in one direction, which is the z-direction. The access control device may further include wherein the optical fiber component is an ONU mini node for mounting at a site of a residence, and the ONU mini node is mounted such that optical ports of the ONU mini node are arranged to face downward. The access control device may further include wherein the pivotable component platform is configured to be attached to the optical fiber configuration base member, and is configured to pivot relative to the optical fiber configuration base member. The access control device may further include a kickstand for the pivotable component platform is provided in the optical fiber configuration base member, the kickstand including a latching mechanism configured to permit the kickstand to engage with the pivotable component platform so that the platform rests in a testing/cleaning configuration. The access control device may further include a first housing portion, and a second housing portion configured to be pivotally coupled to the first housing portion, the first housing portion and the second housing portion being configured to cooperate to define an enclosure having a cavity, the second housing portion being configured to pivot relative to the first housing portion between an open configuration providing access to the cavity and a closed configuration preventing access to the cavity.

The access control device may further include an access control panel member configured to be coupled to a radio frequency (RF) cable component, the RF cable component being configured to be coupled to one or more RF cables, wherein the access control panel, when in a first access position, blocks access to the optical fiber component, while providing an operator access to the RF cable component. The access control device may further include wherein the access control panel member is configured to be pivotally coupled to the optical fiber configuration base member so as to pivot between the first access position, where the operator is permitted to access the coaxial cable component and not permitted to access the optical fiber component, and a second access position, where an operator is permitted to access the optical fiber component without having to de-couple the coaxial cable component from the coaxial cable. The access control device may further include wherein the second access position only occurs after the first access position occurs. The access control device may further include the pivot axis of the access control panel member is offset from a face surface of the access control panel member to allow: (i) an RF input cable to bend freely from one side of the access control panel member to the other side of the access control panel member, and (ii) signal splitting RF output cables that exit from the RF system component to remain connected to the RF cable component and exit through apertures in the first housing portion, when the access control panel member pivots from the first access position to the second access position.

One or more other aspects of the disclosure may provide an access control device comprising: a configuration base member configured to be coupled to a first type of telecommunications system component and to arrange the first type of telecommunications system component so as to create a peripheral cable path around at least a portion of the first type of telecommunications system component, and a component platform configured to be pivotally connected to the configuration base member, the component platform being configured to have the first type of telecommunications system component mounted thereto, and wherein the component platform is connected to the configuration base member via a connection portion that permits the component platform to pivot to a configuration such that the component platform is tilted away from the base member. The access control device may further include wherein the peripheral cable path is configured to receive slack cable, encircle the slack cable around a portion of the first type of telecommunications system component, and shape the slack cable so as to be connected to the first type of telecommunications system component while preventing the slack cable from being less than a minimum optical fiber bend radius of the slack cable when the slack cable is connected to the first type of telecommunications system component.

The access control device may further include the slack cable wraps around at least three quarters of the first type of telecommunications system component within the configuration base member. The access control device may further include wrap guides configured to extend from the configuration base member so as to control the bend radius of the slack cable stored in the configuration base member. The access control device may further include wherein the configuration base member has an outer rectangular shape and an inner rectangular shape, and the outer rectangular shape is configured to match and fit within a housing. The access control device may further include wherein the component platform is configured to pivot in one direction, which is the z-direction. The access control device may further include wherein the first type of telecommunications system is an ONU mini node for mounting at a site of a residence, and the ONU mini node is mounted such that optical ports of the ONU mini node are arranged to face downward. The access control device may further include wherein the pivotable component platform is configured to be attached to the configuration base member, and is configured to pivot relative to the configuration base member. The access control device may further include wherein a kickstand for the pivotable component platform is provided in the configuration base member, the kickstand including a latching mechanism configured to permit the kickstand to engage with the component platform so that the platform rests in a testing/cleaning configuration. The access control device may further include a first housing portion, and a second housing portion configured to be pivotally coupled to the first housing portion, the first housing portion and the second housing portion being configured to cooperate to define an enclosure having a cavity, the second housing portion being configured to pivot relative to the first housing portion between an open configuration providing access to the cavity and a closed configuration preventing access to the cavity.

The access control device may further include an access control panel member configured to be coupled to a second type of telecommunications system component, the second type of telecommunications system component being configured to be coupled to a coaxial cable, wherein the access control panel, when in a first access position, blocks access to the first type of telecommunications system component, while providing an operator access to the second type of telecommunications system component. The access control device may further include wherein the access control panel member is configured to be pivotally coupled to the configuration base member so as to pivot between the first access position, where the operator is permitted to access the second type of telecommunications system component and not permitted to access the first type of telecommunications system component, and a second access position, where an operator is permitted to access the first type of telecommunications system component without having to de-couple the second type of telecommunications system component from the cable. The access control device may further include wherein the second access position only occurs after the first access position occurs. The access control device may further include wherein the pivot axis of the access control panel member is offset from a face surface of the access control panel member to allow: (i) an input cable to bend freely from one side of the access control panel member to the other side of the access control panel member, and (ii) signal splitting cables that exit from the second type of telecommunications system component to remain connected to the second type of telecommunications system component and exit through apertures in the first housing portion, when the access control panel member pivots from the first access position to the second access position.

One or more aspects of the disclosure provide an access control device comprising: a first housing portion having a back wall and a side wall extending from the back wall, a second housing portion coupled to the first housing portion, the first housing portion and the second housing portion cooperating to define an enclosure having a cavity, the second housing portion being movable relative to the first housing portion between an open configuration providing access to the cavity and a closed configuration preventing access to the cavity, a compartment panel disposed in the cavity and being coupled to the first housing portion, the compartment panel being movable relative to the first housing portion between a closed position and an open position, and a component platform configured to be pivotally connected to the back wall of the first housing portion, wherein when the first housing portion is in the open configuration and the compartment panel is in the closed position.

The compartment panel may divide the cavity into a first compartment configured to house a first telecommunications system component therein and a second compartment configured to house a second telecommunications system component therein, the first compartment being closed to block access to the first telecommunications system component, and the second compartment being open such that the second telecommunications system component is accessible to the user, the second type of telecommunications component is mounted to and movable with the compartment panel, the side wall of the first housing portion has at least one aperture configured to accommodate passage of a first cable, which is connected to the first telecommunications system component, from the first compartment to an exterior of the telecommunications box, the compartment panel has an opening at a first end thereof, the first end of the compartment panel being adjacent to the side wall of the first housing portion, the opening being configured to accommodate passage of a second cable, which is connected to the first telecommunications system component and the second telecommunications system component, from the first compartment to the second compartment, when the first housing portion and the second housing portion are in the open configuration and the compartment panel is in the open position, the second compartment and the second telecommunications system component are accessible to the user.

The compartment panel may be configured to be moved between the closed position and the open position while the first cable and the second cable remain connected to the first telecommunications system component and while the second cable remains connected to the second telecommunications system component, and the component platform is configured to be pivotally connected to the back wall of the first housing portion or a base member that is attached to the back wall via a connection portion that allows the component platform to pivot to a configuration such that the component platform is tilted away from the base member.

One or more aspects of the present disclosure provide a compartmentalized telecommunications box for housing components for telecommunications systems. The house box may include a first housing portion having a back wall and a side wall extending from the back wall, a second housing portion coupled to the first housing portion, the first housing portion and the second housing portion cooperating to define an enclosure having a cavity, and a compartment panel disposed in the cavity and being coupled to the first housing portion or the second housing portion, the compartment panel being movable relative to the first housing portion between a closed position and an open position. The second housing portion being movable relative to the first housing portion between an open configuration providing access to the cavity and a closed configuration. The first housing portion and the second housing portion are in the open configuration and the compartment panel is in the closed position, the compartment panel divides the cavity into a first compartment configured to house a first telecommunications system component therein and a second compartment configured to house a second telecommunications system component therein, the first compartment being closed to block access to the first telecommunications system component, and the second compartment being open such that a second telecommunications system component is accessible to the user. The first telecommunications component is mounted to and movable with the panel.

In one embodiment, the first housing portion or second housing portion may be configured to house a specific type of component, such as the fiber optics component. In this embodiment, the back wall of the housing portion may be configured to provide a pivotable component platform. The pivotable component platform may pivot relative to the back wall of the housing portion or a base member (The pivotable component platform may alternatively be provided as part of a base member attached to the back wall of the housing portion for ease of manufacturing/assembly). In this embodiment, if, for example, a fiber optics transceiver is attached to the pivotable component platform, the fiber optics transceiver may pivot so that an experienced technician can connect a testing probe to the transceiver without having to remove the transceiver (e.g., having to unscrew the transceiver). The pivotable component platform may be connected to the back wall or the base member via a connecting portion. For example, the connecting portion may be hinges, or may be an area of the first housing portion that is flexible so that the platform may pivot. The platform may also be configured to provide a kickstand or latch that allows the pivotable component platform to rest in a testing/cleaning configuration.

Regarding cable management, in this embodiment, the side wall of the first housing portion may have at least one aperture configured to accommodate passage of a first cable, which is connected to the first telecommunications system component, from the first compartment to an exterior of the house box. Further, the compartment panel in this embodiment has an opening at a first end thereof, the first end of the panel being adjacent to the side wall of the first housing portion, the opening being configured to accommodate passage of a second cable, which is connected to the first telecommunications system component and the second telecommunications system component, from the first compartment to the second compartment. When the first housing portion and the second housing portion are in the open configuration and the compartment panel is in the open position, the first compartment and the first telecommunications system component are accessible to the user. The compartment panel is configured to be moved between the closed position and the open position while the first cable and the second cable remain connected to the first telecommunications system component and the second telecommunications system component, respectively.

The first housing portion and the second housing portion may both be constructed of weatherproof, durable material, the material being one of plastic and metal. The first housing portion or the second housing portion may be configured to be attached or mounted to a utility pole and/or a residential or commercial building.

The disclosure also shows a compartmentalized box for housing components for telecommunications systems, comprising: a first housing portion, a second housing portion pivotally coupled to the first housing portion, the first housing portion and the second housing portion cooperating to define an enclosure having a cavity, the second housing portion being pivotally movable relative to the first housing portion between an open configuration providing access to the cavity and a closed configuration, a first telecommunications system component mounted to the first housing portion, a compartment panel disposed in the cavity and being pivotally coupled to the first housing portion, the compartment panel being pivotally movable relative to the first housing portion between a closed position and an open position, and a second telecommunications system component mounted to the compartment panel, the second telecommunications system component being accessible to a user when the first housing portion and the second housing portion are in the open configuration and the compartment panel is in the closed position, wherein when the first housing portion and the second housing portion are in the open configuration and the compartment panel is in the closed position, the compartment panel divides the cavity into a first compartment and a second compartment, the first compartment and the second telecommunications system component being accessible to the user and the second compartment being closed to block access to the first telecommunications system component, and when the first housing portion and the second housing portion are in the open configuration and the compartment panel is in the open position, the second compartment and the first telecommunications system component are accessible to the user.

The disclosure also provides an enclosable box for housing components from more than one telecommunications system, comprising: a first housing portion, a second housing portion, a box mounting hinge that connects the first housing portion and the second housing portion, an internal telecommunications component compartment panel, a compartment panel mounting hinge that connects the internal telecommunications component compartment with one of the first and second housing portions, wherein the box mounting hinge is configured to allow the first housing portion and second housing portion to open and close in a clam like manner, the compartment panel mounting hinge is configured to allow the compartment panel to open and close an internal compartment or cavity that is large enough to enclose at least a first telecommunications systems component.

The upper surface of the compartment panel may be configured to be mounted by a second telecommunications component within the housing. The second telecommunications system may be different than the first telecommunications system. The first telecommunications system component may be a fiber optics telecommunications system component. The second telecommunications system component may be an RF or coaxial cable component. The outer portion of either the first or second housing portions may be configured to be attached or mounted to a utility pole and/or a residential or commercial building. The enclosable house box may further include a second box mounting hinge, and an entry hole may be formed in the house box (e.g., between the box mounting hinges) that provides enough clearance for cables/cords to be provided to the internal compartment of the box and/or the remaining cavity outside of the internal compartment within the box. The internal compartment panel, when closed, may be configured to provide a secure enclosure to one or more first telecommunications system components within a cavity enclosed by the internal compartment panel. The enclosable box may be configured to, when the house box and panel are both closed, provide a secure enclosure for housing one or more second telecommunications system components in the remaining cavity space of the box outside of the internal compartment cavity.

BRIEF DESCRIPTION OF THE DRAWINGS

Exemplary embodiments will be described with reference to the following drawings.

FIG. 4 shows a cross-sectional view of the exemplary coaxial cable of

FIG. 3.

DETAILED DESCRIPTION OF EXEMPLARY EMBODIMENTS

Figure 1:
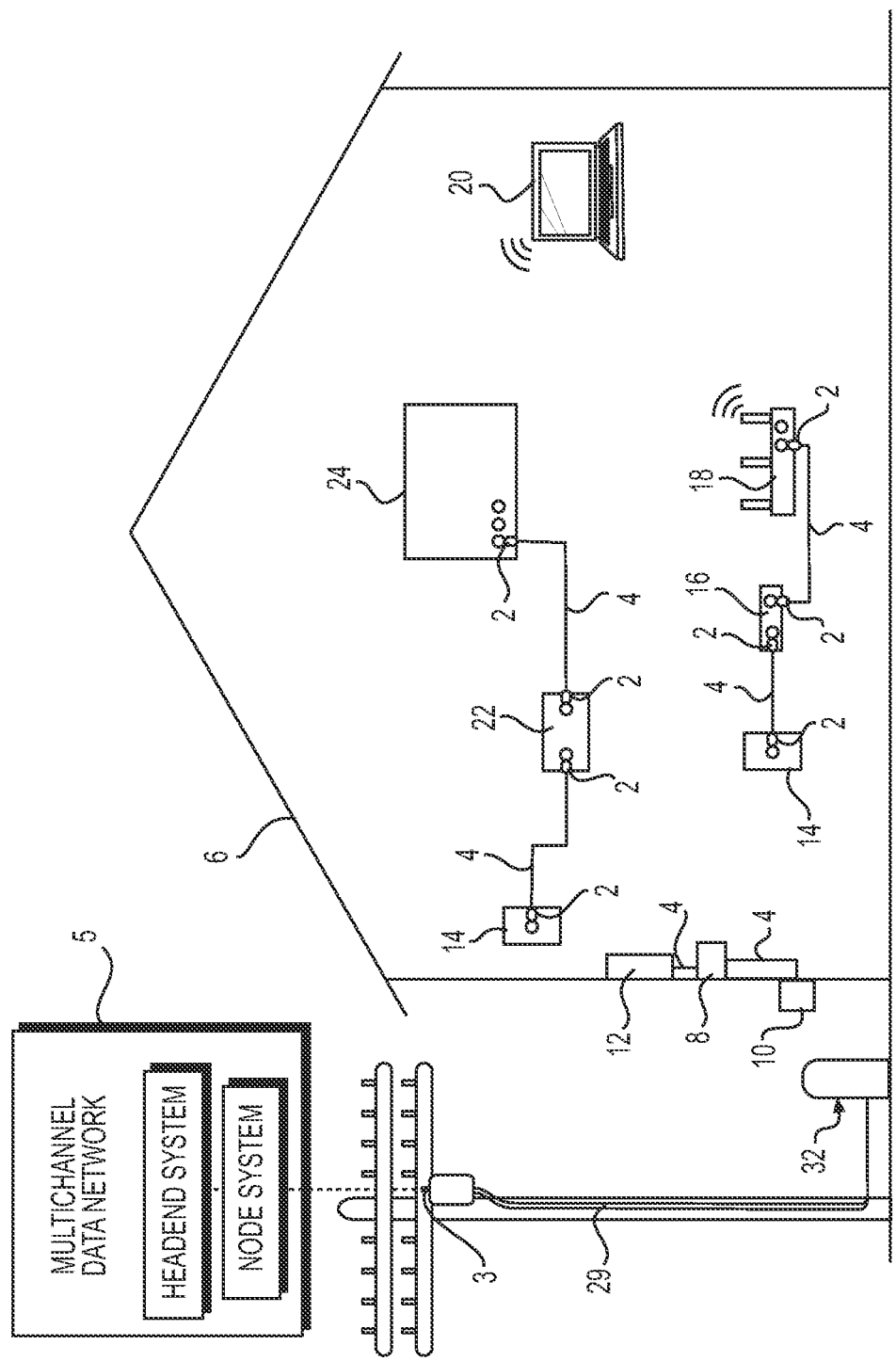
FIG. 1 shows a schematic view of an exemplary network environment in accordance with various aspects of the disclosure.

FIG. 1 shows a schematic view of an exemplary network environment 6 in accordance with various aspects of the disclosure. In particular, cable connectors 2 and 3 may enable the exchange of data signals between a broadband network or a multichannel data network 5, and various devices within a home, building, venue or other environment 6. For example, the environment 6 may include the following devices: (a) a point of entry ("PoE") filter 8 operatively coupled to an outdoor cable junction device 10, (b) one or more signal splitters within a service panel 12 which distributes the data service to interface ports 14 of various rooms or parts of the environment 6, (c) a modem 16 which modulates radio frequency ("RF") signals to generate digital signals to operate a wireless router 18, (d) an Internet accessible device, such as a mobile phone or computer 20, wirelessly coupled to the wireless router 18, and (e) a set-top unit 22 coupled to a television ("TV") 24. In one embodiment, the set-top unit 22, typically supplied by the data provider (e.g., the cable TV company), may include a TV tuner and a digital adapter for High Definition TV.

In some embodiments, the multichannel data network 5 may include a telecommunications, cable/satellite TV ("CATV") network operable to process and distribute different RF signals or channels of signals for a variety of services, including, but not limited to, TV, Internet and voice communication by phone. For TV service, each unique radio frequency or channel is associated with a different TV channel. The set-top unit 22 converts the radio frequencies to a digital format for delivery to the TV. Through the data network 5, the service provider can distribute a variety of types of data, including, but not limited to, TV programs including on-demand videos, Internet service including wireless or WiFi Internet service, voice data distributed through digital phone service or Voice Over Internet Protocol ("VoIP") phone service, Internet Protocol TV ("IPTV") data streams, multimedia content, audio data, music, radio and other types of data/data services.

In some embodiments, the multichannel data network 5 is operatively coupled to a multimedia home entertainment network serving the environment 6. In one example, such multimedia home entertainment network is the Multimedia over Coax Alliance ("MoCA") network. The MoCA network increases the freedom of access to the data network 5 at various rooms and locations within the environment 6. The MoCA network, in one embodiment, operates on cables 4 within the environment 6 at frequencies in the range of 1125 MHz to 1675 MHz. MoCA compatible devices can form a private network inside the environment 6.

As shown in FIG. 1, coaxial cables 4, 29 may be provided at different locations and may be configured to distribute the data to the environment 6 via connectors 2 attached to the coaxial cables 4. The cables 4, through use of the connectors 2, are connectable to various communication interfaces within the environment 6, such as the female interface port 14 illustrated in FIG. 2. In the examples shown, female interface ports 14 are incorporated into: (a) a signal splitter within an outdoor cable service or distribution box 32 which distributes data service to multiple homes or environments 6 close to each other, (b) a signal splitter within the outdoor cable junction box or cable junction device 10 which distributes the data service into the environment 6, (c) the set-top unit 22, (d) the TV 24, (e) wall-mounted jacks, such as a wall plate, and (f) the router 18.

Figure 2:
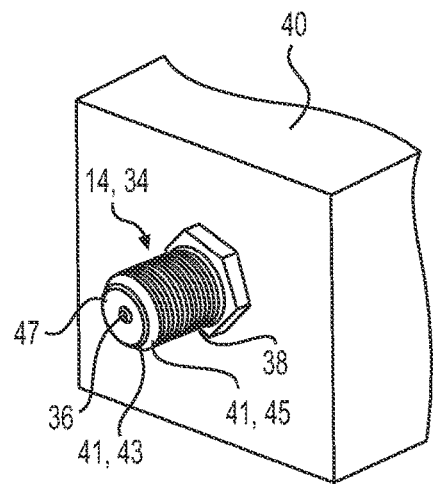
FIG. 2 shows a perspective view of an exemplary interface port in accordance with various aspects of the disclosure.

In one embodiment, each of the female interface ports 14 includes a stud or jack, such as the cylindrical stud 34 illustrated in FIG. 2. The stud 34 may have: (a) an inner, cylindrical wall 36 defining a central hole configured to receive an electrical contact, wire, pin, conductor (not shown) positioned within the central hole, (b) a conductive, threaded outer surface 38, (c) a conical conductive region 41 having conductive contact sections 43 and 45, and (d) a dielectric or insulation material 47.

In some embodiments, stud 34 is shaped and sized to be compatible with the F-type coaxial connection standard. It should be understood that, depending upon the embodiment, stud 34 could have a smooth outer surface. The stud 34 can be operatively coupled to, or incorporated into, a device 40 which can include, for example, a cable splitter of a distribution box 32, outdoor cable junction box 10 or service panel 12, a set-top unit 22, a TV 24, a wall plate, a modem 16, a router 18, or the junction device 33.

During installation, the installer (installing technician) may couple a cable 4 to an interface port 14 by screwing or pushing the connector 2 onto the female interface port 34. Once installed, the connector 2 receives the female interface port 34. The connector 2 establishes an electrical connection between the cable 4 and the electrical contact of the female interface port 34.

The coaxial cable 4 may extend along a cable axis or a longitudinal axis. In one embodiment, the cable 4 includes: (a) an elongated center conductor or inner conductor 44, (b) an elongated insulator 46 coaxially surrounding the inner conductor 44, (c) an elongated, conductive foil layer 48 coaxially surrounding the insulator 46, (d) an elongated outer conductor 50 coaxially surrounding the foil layer 48, and (e) an elongated sheath, sleeve or jacket 52 coaxially surrounding the outer conductor 50.

The inner conductor 44 is operable to carry data signals to and from the data network 5. Depending upon the embodiment, the inner conductor 44 can be a strand, a solid wire or a hollow, tubular wire. The inner conductor 44 is, in one embodiment, constructed of a conductive material suitable for data transmission, such as a metal or alloy including copper, including, but not limited to, copper-clad aluminum ("CCA"), copper-clad steel ("CCS") or silver-coated copper-clad steel ("SCCCS").

The insulator 46, in some embodiments, is a dielectric having a tubular shape. In one embodiment, the insulator 46 is radially compressible along a radius or radial line 54, and the insulator 46 is axially flexible along the longitudinal axis 42. Depending upon the embodiment, the insulator 46 can be a suitable polymer, such as polyethylene ("PE") or a fluoropolymer, in solid or foam form.

Figure 3:
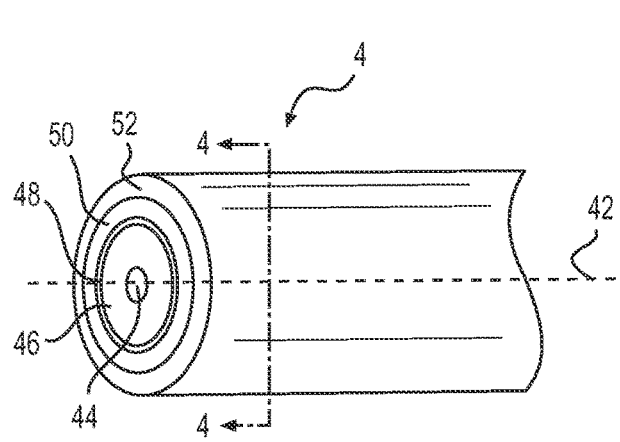
FIG. 3 shows a perspective view of an exemplary coaxial cable in accordance with various aspects of the disclosure.
Figure 4:
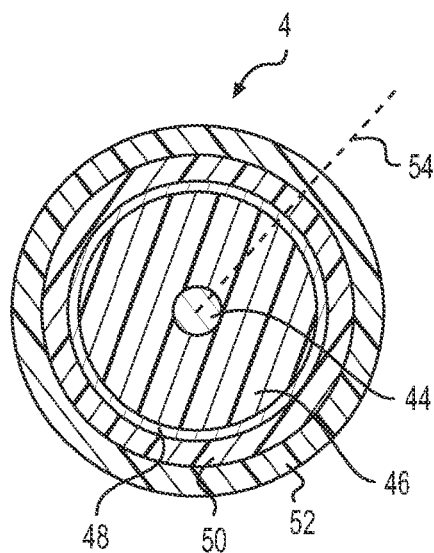

In the embodiment illustrated in FIGS. 3 and 4 (cross-sectional view), the outer conductor 50 includes a conductive RF shield or electromagnetic radiation shield. In such embodiment, the outer conductor 50 includes a conductive screen, mesh or braid or otherwise has a perforated configuration defining a matrix, grid or array of openings. In one such embodiment, the braided outer conductor 50 has an aluminum material or a suitable combination of aluminum and polyester. Depending upon the embodiment, cable 4 can include multiple, overlapping layers of braided outer conductors 50, such as a dual-shield configuration, tri-shield configuration or quad-shield configuration.

In one embodiment, the connector 2 electrically grounds the outer conductor 50 of the coaxial cable 4. The conductive foil layer 48, in one embodiment, is an additional, tubular conductor which provides additional shielding of the magnetic fields. In one embodiment, the jacket 52 has a protective characteristic, guarding the cable's internal components from damage. The jacket 52 also has an electrical insulation characteristic.

Figure 5:
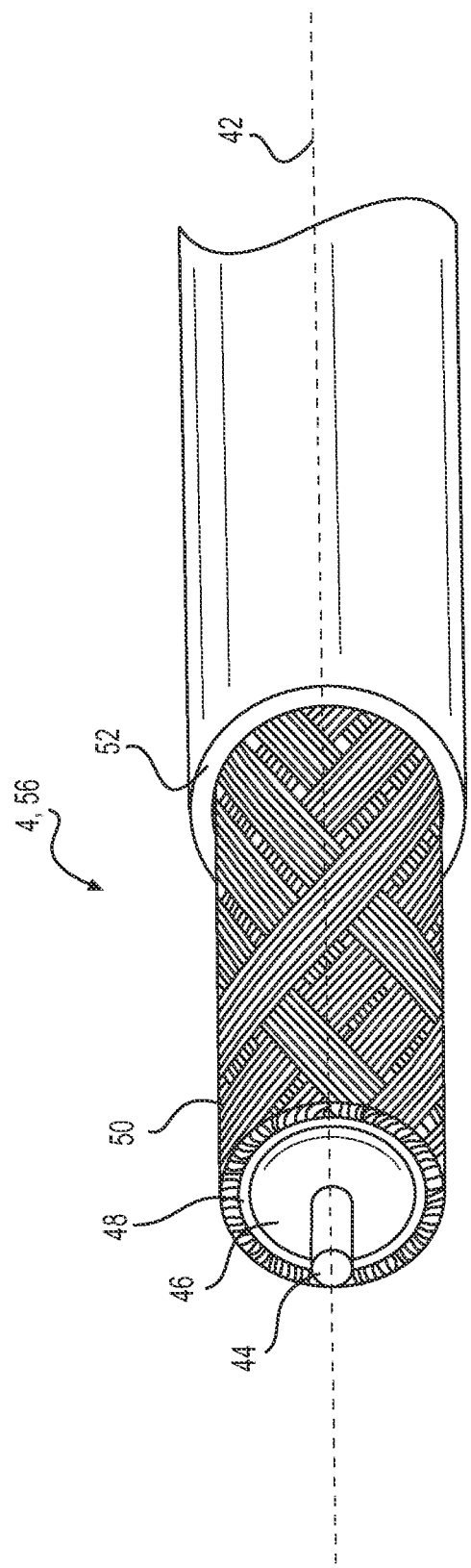
FIG. 5 shows a perspective view of an exemplary prepared end of the exemplary coaxial cable of FIG. 3.

As shown in FIG. 5, during installation, an installer or preparer may prepare a terminal end 56 of the cable 4 so that it can be mechanically connected to the connector 2. To do so, the preparer removes or strips away differently sized portions of the jacket 52, outer conductor 50, foil 48 and insulator 46 so as to expose the side walls of the jacket 52, outer conductor 50, foil layer 48 and insulator 46 in a stepped or staggered fashion. In the example shown in FIG. 5, the prepared end 56 has a two step-shaped configuration. At this point, the cable 4 is ready to be connected to the connector 2. In some embodiments, the prepared end has a three step-shaped configuration (not shown), where the insulator 46 extends beyond an end of the foil 48 and outer conductor 50.

Depending upon the embodiment, the components of the cable 4 can be constructed of various materials which have some degree of elasticity or flexibility. The elasticity enables the cable 4 to flex or bend in accordance with broadband communications standards, installation methods or installation equipment. Also, the radial thicknesses of the cable 4, the inner conductor 44, the insulator 46, the conductive foil layer 48, the outer conductor 50 and the jacket 52 can vary based upon parameters corresponding to broadband communication standards or installation equipment.

Figure 6:
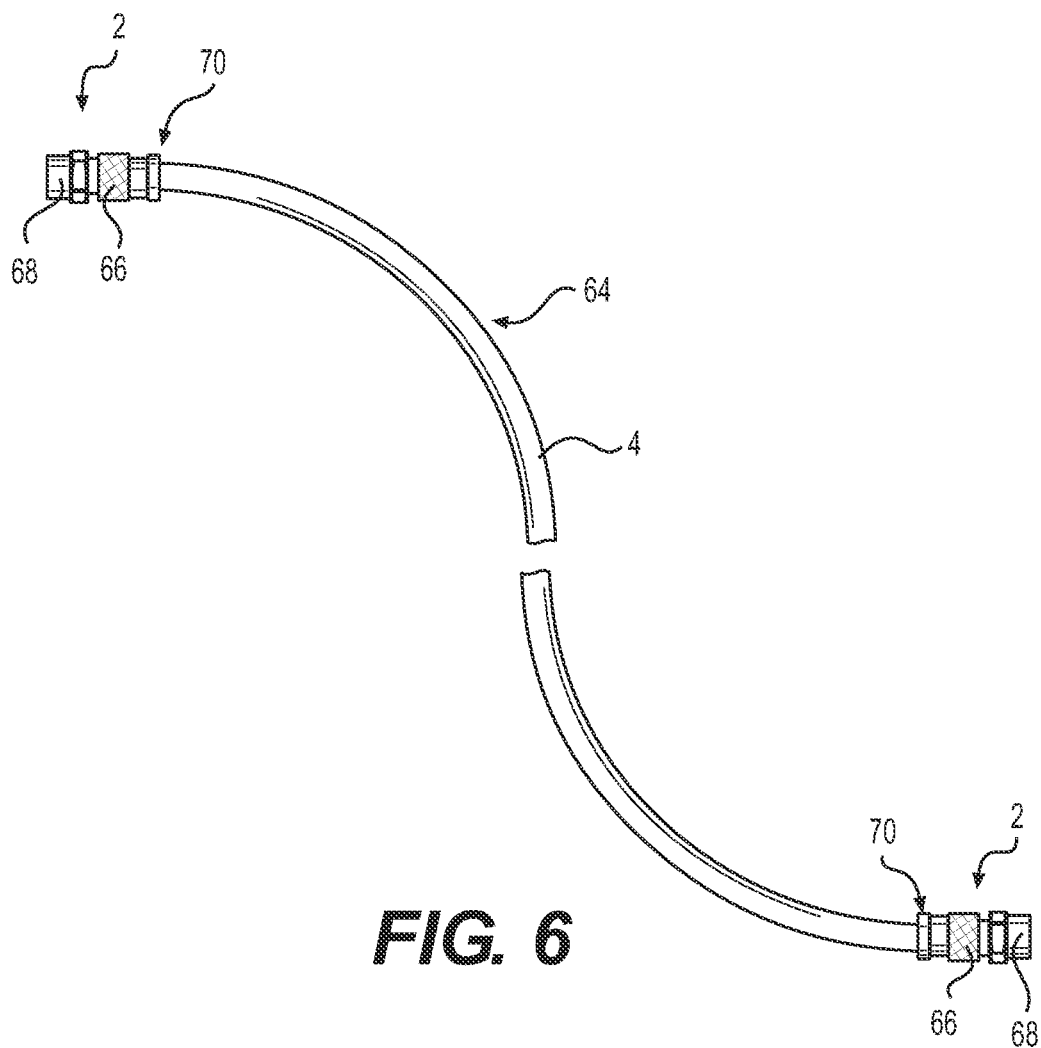
FIG. 6 shows a top view of one embodiment of a coaxial cable jumper or cable assembly which is configured to be operatively coupled to a multichannel data network.

In one embodiment illustrated in FIG. 6, a cable jumper or cable assembly 64 includes a combination of the connector 2 and the cable 4 attached to the connector 2. In this embodiment, the connector 2 includes a connector body or connector housing 66 and a fastener or coupler 68, such as a threaded nut, which is rotatably coupled to the connector housing 66. The cable assembly 64 has, in one embodiment, connectors 2 on both of its ends 70. In some embodiments, the cable assembly 64 may have a connector 2 on one end and either no connector or a different connector at the other end. Preassembled cable jumpers or cable assemblies 64 can facilitate the installation of cables 4 for various purposes.

The cable 4 may be a weatherized coaxial cable 29 that has the same structure, configuration and components as coaxial cable 4 except that the weatherized coaxial cable includes additional weather protective and durability enhancement characteristics. These characteristics enable the weatherized coaxial cable to withstand greater forces and degradation factors caused by outdoor exposure to weather.

During installation the installation technician may perform a folding process to prepare the cable 4 for connection to connector 2. The preparer may fold the braided outer conductor 50 folded backward onto the jacket 52. As a result, the folded section 60 may be oriented inside out. The bend or fold 62 may be adjacent to the foil layer 48 as shown. Certain embodiments of the connector 2 include a tubular post. In such embodiments, this folding process can facilitate the insertion of such post in between the braided outer conductor 50 and the foil layer 4.

Depending upon the embodiment, the components of the cable 4 can be constructed of various materials which have some degree of elasticity or flexibility, which enables the cable 4 to flex or bend in accordance with broadband communications standards, installation methods or installation equipment. Further, the radial thicknesses of the cable 4, the inner conductor 44, the insulator 46, the conductive foil layer 48, the outer conductor 50 and the jacket 52 can vary based upon parameters corresponding to broadband communication standards or installation equipment.

FIGS. 7-11 illustrate a first embodiment of a universal multi-purpose compartmentalized telecommunications box 100 (or "entry box," "house box," or "fiber box") in accordance with various aspects of the disclosure. In particular, FIGS. 7-11 show the parts of an embodiment of the telecommunications box 100 that may be configured to house multiple types of telecommunications system components, for example, fiber optic system components and RF system components. The telecommunications box 100 may comprise a housing including a first housing portion 102 and a second housing portion 104, that are permanently (or semi-permanently) pivotally joined together at corresponding first edges 102A, 104A allowing the box to pivotally open and close. For example, the first and second housing portions 102, 104 may be joined together by a box mounting hinge 100A that is configured to allow the first and second housing portions to pivotally open, such as, by a force that causes opposite corresponding second edges 102B, 104B of the first and second housing portions 102, 104 to move in opposite directions. The first and/or second housing portions 102, 104 may form an internal box cavity 106. As shown in the embodiments disclosed herein, a larger portion of the cavity 106 may be located in first housing portion 102 than in the second housing portion 104. It should be appreciated that the cavity 106 may be split between the first and second housing portions 102, 104 and/or modified as desired. When the telecommunications box 100 is closed, the box 100 forms an enclosure that can provide protection from weather, fire, and/or theft of two or more telecommunications installation systems (and their respective installation components).

Figure 7:
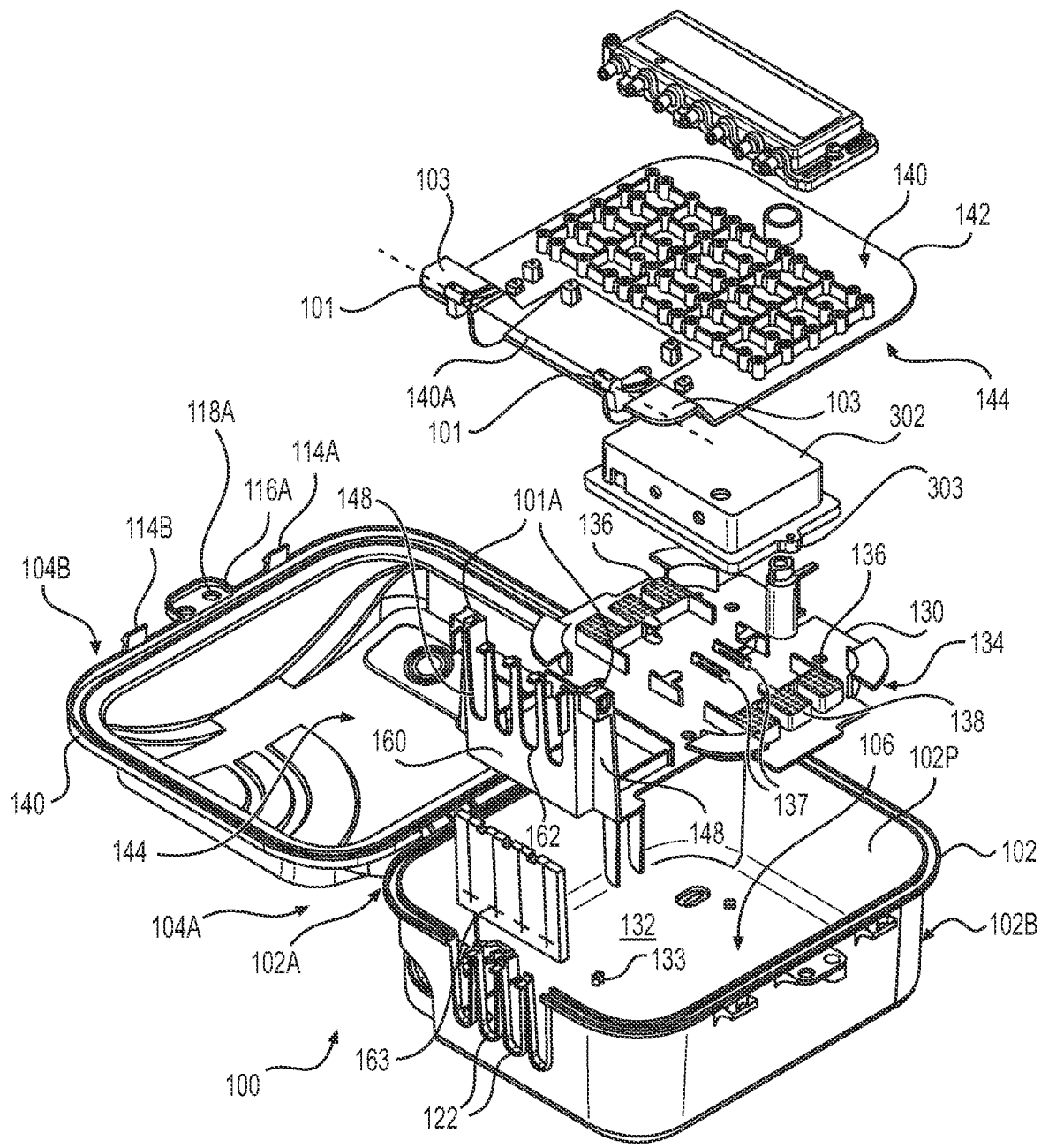
FIG. 7 shows an exploded view of a first embodiment of an exemplary telecommunications box in accordance with various aspects of the disclosure.
Figure 8:
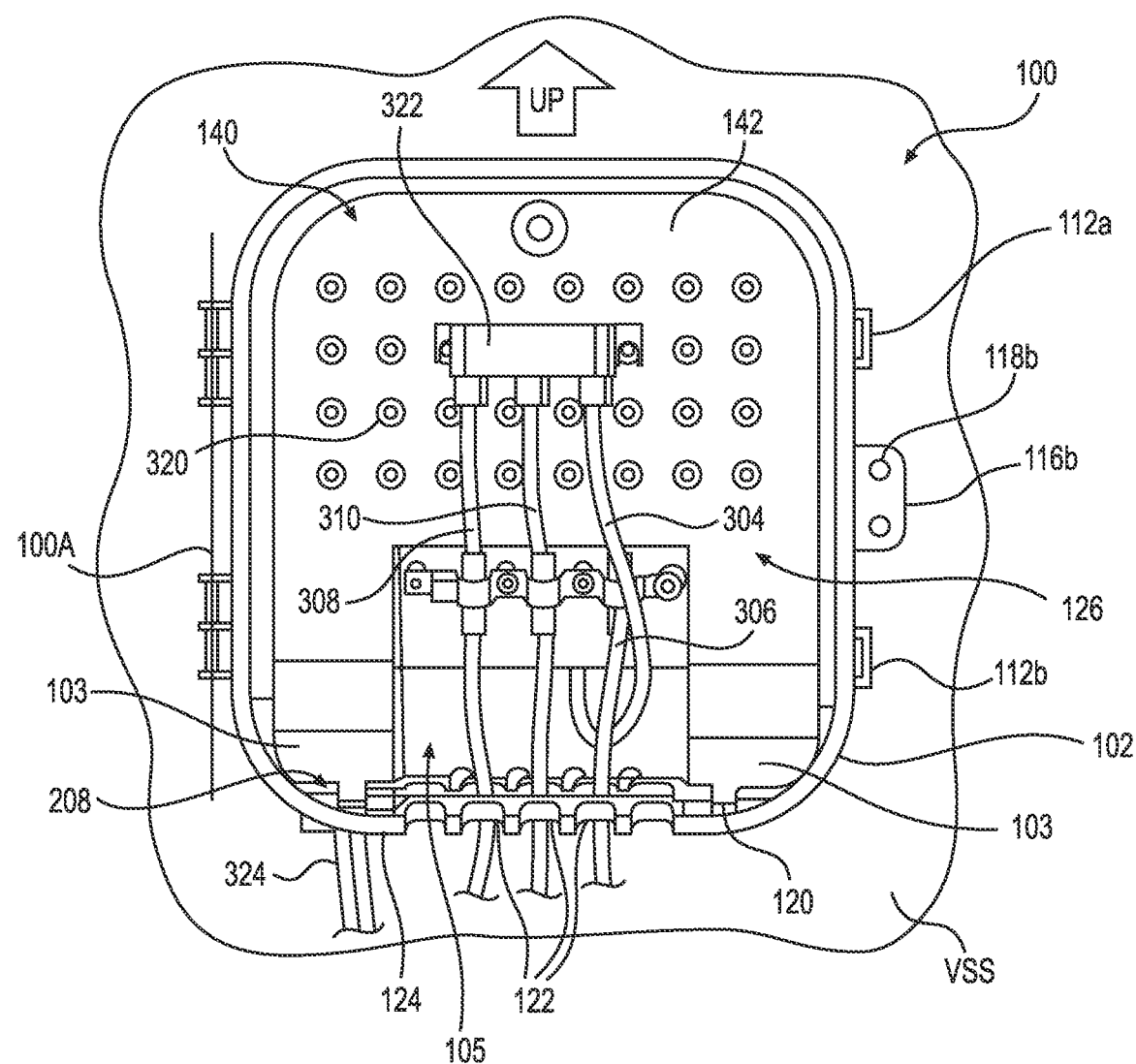
FIG. 8 shows a front view of the first embodiment of the exemplary telecommunications box with a segregating or hidden compartment panel in a closed position.
Figure 9:
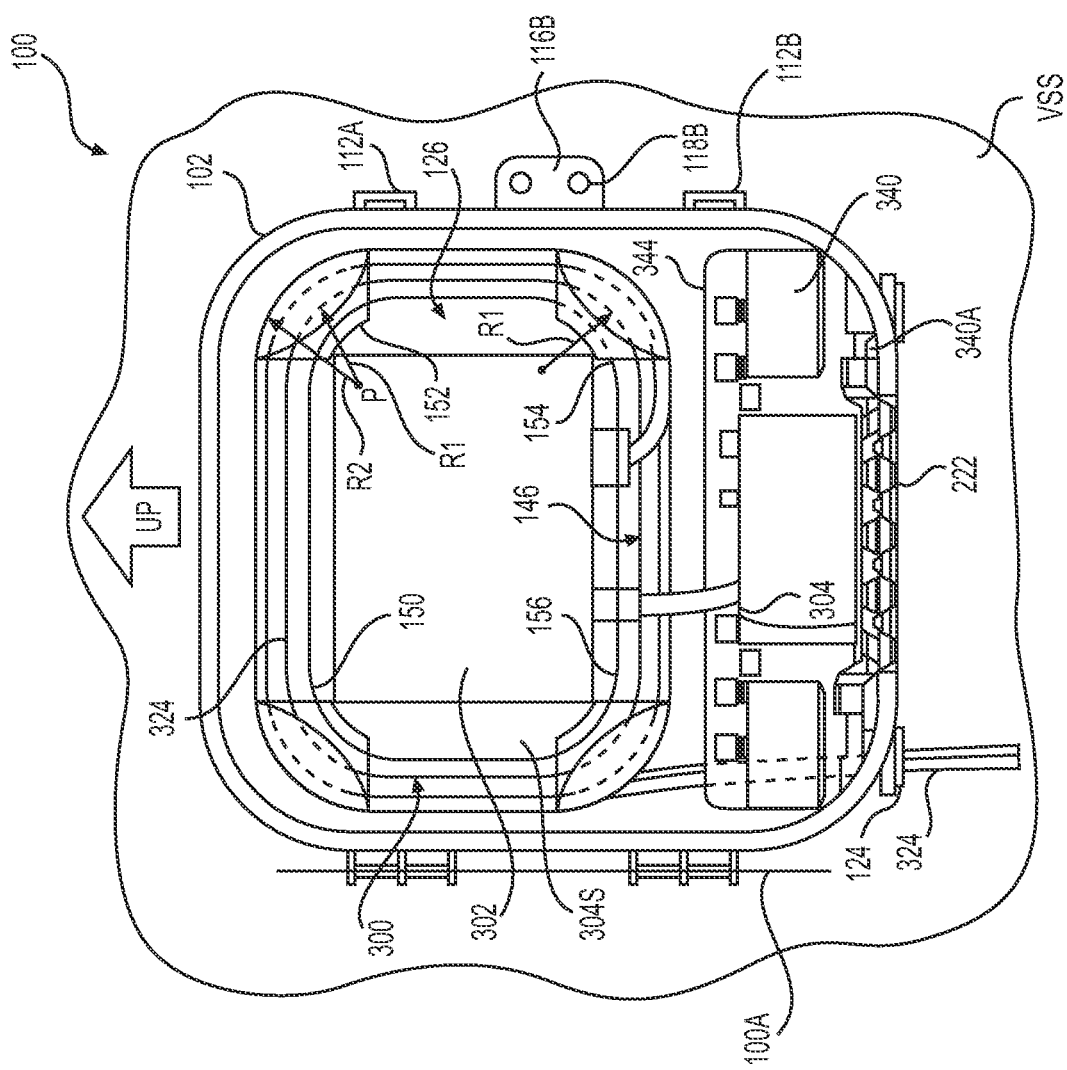
FIG. 9 shows a front view of the first embodiment of the exemplary telecommunications box with the segregating or hidden compartment panel in an open position.
Figure 10:
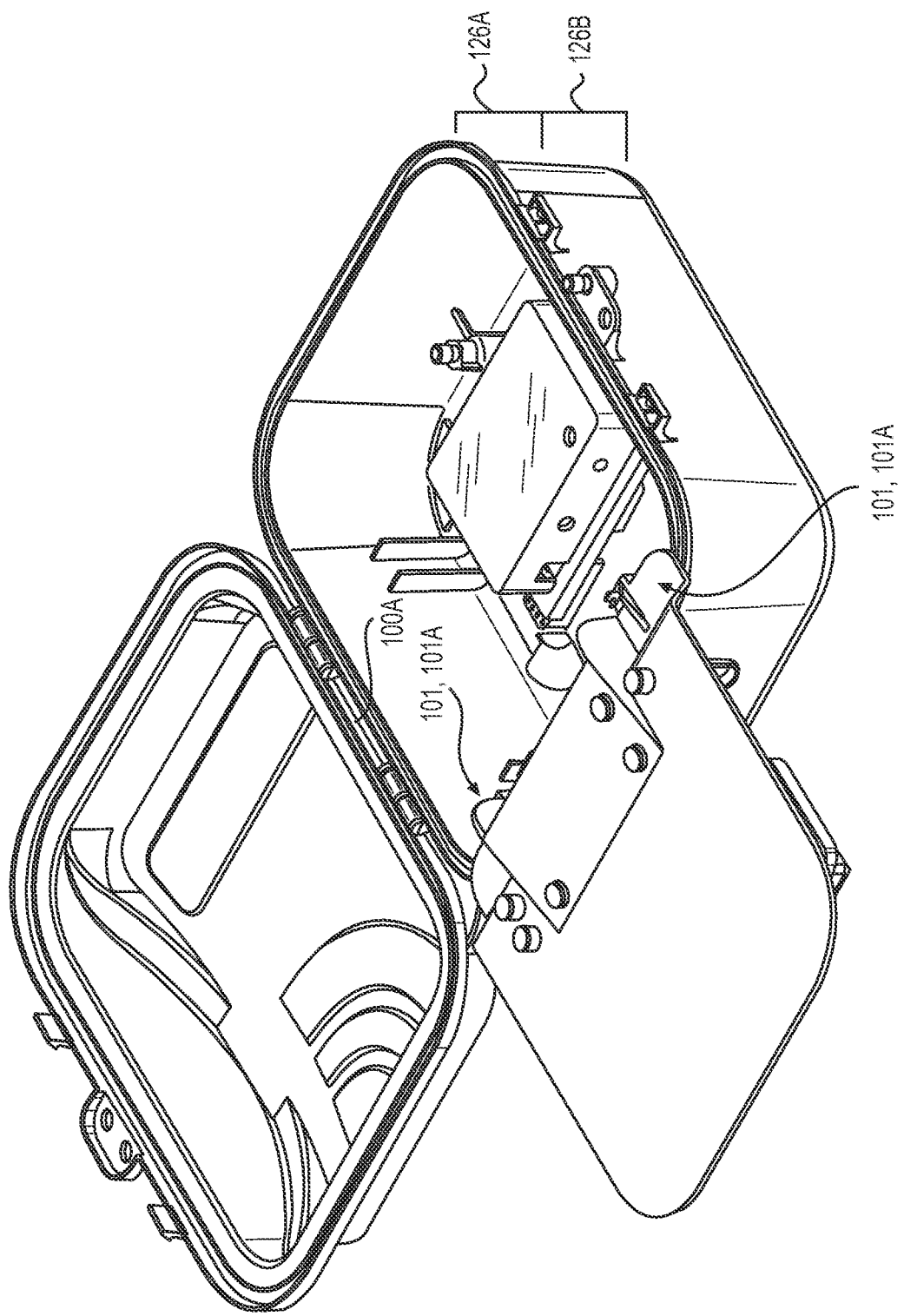
FIG. 10 shows a perspective view of the first embodiment of the exemplary telecommunications box with a segregating or hidden compartment panel in an open position.
Figure 11:
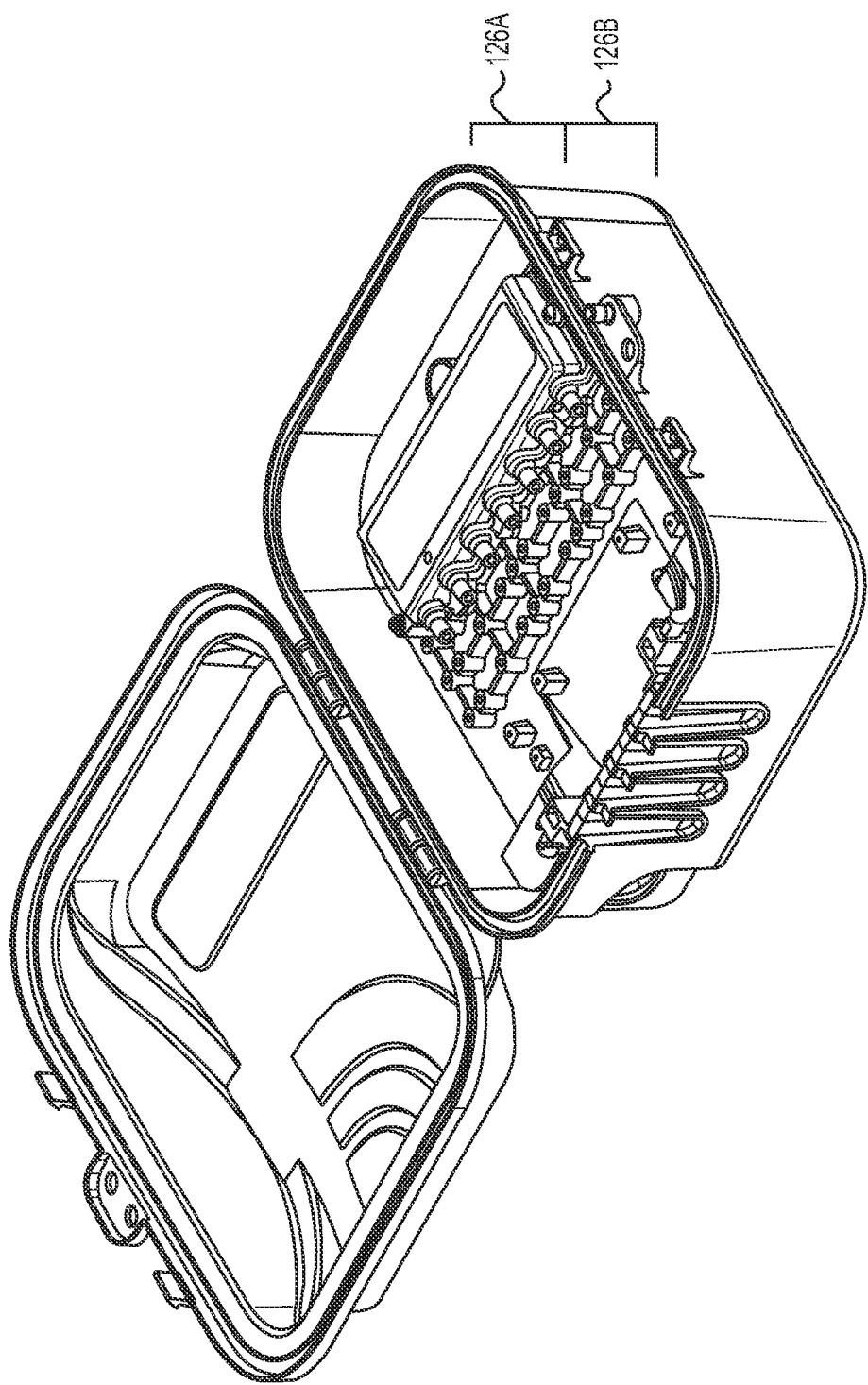
FIG. 11 shows a perspective view of the first embodiment of the exemplary telecommunications box with a segregating or hidden compartment panel in a closed position.

As shown in FIGS. 7-9, the hinge axis 100A is vertical when the telecommunications box 100 is mounted to a vertical support structure VSS disposed in the direction of the arrow labeled "UP." The secure enclosure 100 may be detachably joined along the opposite edge or side by locking tabs to facilitate opening/closing of secure enclosure 100. For example, the locking tabs 110 (FIG. 8) may include a molded U-shaped opening 112a, 112b in one of the first and second housing portions 102, 104 and corresponding resilient clasps 114a, 114b integrally formed in the other of the first and second housing portions 102, 104. The locking tabs 110 may be augmented by fittings 116a, 116b having aligned apertures 118a, 118b for accepting a lock and key to secure the telecommunications box 100 in a closed position.

Referring to FIGS. 7-9, the cavity 106 of the first and second housing portions 102, 104 may be configured to contain or house first and second telecommunications systems 300, 320 each including at least one telecommunications system component. In the described embodiment, the first telecommunications system is a fiber optic system 300 and includes a fiber optic converter 302 operative to convert an optic signal received along a fiber optic cable 324 into a digital signal to be transmitted along a coaxial cable 304 to the second telecommunications system 320. The second telecommunications system 320 is a coaxial cable system and includes a cable splitter 322 operative to split a signal entering via the input cable 304 into multiple signals exiting the box 100 along output cables 306, 308, 310. Each of the telecommunications systems 300, 320 relies on inherently different underlying technology for its operation. Fiber optic cables rely on optics or light for data transmission while coaxial cable relies on the precise spacing between inner and outer conductors to efficiently transmit signals in the radio frequency band or spectrum.

The first housing portion 102 of the box 100 has a first (bottom) wall 120 having an opening 124 for receiving the fiber optic cable 324 that directs an optic signal to the fiber optic telecommunications system component 300. The first wall 120 also includes apertures 122 through which a fiber optic or coaxial cable may be fed. The apertures 122 may be elongated in the plane of the first wall 120 so that different diameter cables or a plurality of cables can be accommodated by the apertures 122. The apertures 122 may employ a simple gasket (not shown) through which a fiber optic or coaxial cable is fed, or a bulkhead connection (also not shown). In the described embodiment, the apertures 122 are disposed in the bottom wall 120 such that the cables 306, 308, 310 and 324 enter/exit vertically through the apertures 122. Furthermore, the downward orientation minimizes the number and severity of cable bends, as will be discussed in more detail below.

Referring to FIG. 7, the telecommunications box 100 includes a base plate 130 and a pivoting panel or deck 140. The base plate 130 is configured to be fixedly coupled with a back wall 132 of the box 100. For example, the back wall 132 may include projections 133 that can be snap fit into corresponding recesses (not shown) of a back surface of the base plate 130, as would be understood by persons skilled in the art. Alternatively or additionally, the base plate 130 can be coupled with the back wall 132 of the box 100 by screws, bolts, or the like. Further, when the telecommunications box 100 is attached to the vertical support structure VSS, fasteners (not shown) that attach the box 100 to the VSS may extend through the base plate 130 and the back wall 132 of the box, thereby further securing the base plate 130 to the back wall 132. Alternatively, it is possible to not have a base plate, and simply have the back wall 132 be configured like the base plate.

The base plate 130 as a base member includes a first portion 134 configured to mount the fiber optic converter 302. For example, the first portion 134 may include a plurality of raised mounting platforms 136 that are structured and arranged to universally accommodate most commercially available fiber optic converters 302. For example, fiber optic converters 302 conventionally include mounting tabs 303 arranged at opposite sides, diagonal corner, four corners, etc. Each of the raised mounting platforms 136 has a plurality of preformed holes 138 configured to receive screws (not shown) conventionally used to mount a fiber optic converter 302 to a mounting box. The number and spacing of the holes 138 provides a universal mounting system for most conventional fiber optic converters. Furthermore, as illustrated in FIGS. 17-20, and discussed in more detail below, the base plate 130 may include a component platform 601.

As illustrated in FIG. 7, when the fiber optic converter 302 is mounted to the base plate 130, the raised mounting platforms 136 maintain the fiber optic converter 302 spaced from a surface of the base plate 130, which assists with passive cooling of the converter 302. Further, the platforms 136 are spaced from one another to provide adequate space to accommodate a fiber optic splice (not shown), as well as an amount of slack of bare optic fiber. The base plate 130 may include a pair of parallel raised projections 137 that each includes a slot configured to receive a conventional fiber optic splice member (not shown).

The base plate 130 includes a plurality of wrap guides 150, 152, 154, 156 that extend in a direction from the back wall 132 of the box 100 toward the second housing portion 104 and cooperate with an inner peripheral surface 102P of the first housing portion 102 to delimit a peripheral channel 146 (FIG. 9). The channel 146 is substantially rectangular in shape and produces a bend radius which is greater than the minimum bend radius of the fiber optic cable 324. In the described embodiment, therefore, the width of the channel 146 is the difference between radii R2 and R1 (depicted in FIG. 9). The radial distance R2 is the distance from a reference point P to the outer surface of one of the wrap guides 150, 152, 154, 156 while the radial distance R1 is the distance from the reference point P to the inner surface of the respective one of the wrap guides 150, 152, 154, 156.

The geometry of the wrap guides 150, 152, 154, 156 causes the fiber optic cable 324 to follow an arcuate path R which is greater than or equal to the minimum bend radius of the fiber optic cable 324. The bend radius of the channel 146 in the area of the wrap guides 350, 352, 354, 356 is generally greater than the minimum permissible bend radius of the cable 324 to prevent signal losses. For example, as the bend radius of an optic fiber or filament decreases, the incident light energy is not fully reflected internally of the optic filament. Accordingly, light energy is refracted out of the filament causing a portion of the light energy to be absorbed or lost.

For cable management, the base plate 130 includes a second portion 144 that extends from the first portion 134 toward the first (bottom) wall 120 of the box 100. The second portion 144 includes a pair of columns 148 that extend in a direction from the back wall 132 of the first housing portion 102 toward the second housing portion 104. A wall 160 extends between the columns 148 parallel to and spaced from the first wall 120 of the box 100. The wall 160 includes elongated apertures 162 substantially aligned with the apertures 122 of the first wall 120 of the box 100. A rubber or foam insert 163 may be sandwiched between the wall 160 of the base plate 130 and the first wall 120 of the box 100. The insert 163 includes elongated slits substantially aligned with the apertures 122, 162 to receive telecommunications cables while preventing the infiltration of debris (e.g., leaves, soil, and pollen) into the cavity 106 of the box.

The pivoting compartment panel 140, or also referred to as a deck, pivotally mounts relative to the base plate 130 of the housing 100 and segregates the first and second telecommunications systems, i.e., the fiber optic telecommunications system 300 and the coaxial cable telecommunications system 320. More specifically, the panel 140 segregates the fiber optic system components 302 and fiber optics cable 324 from the coaxial component 322 and the coaxial cables 304, 306, 308, 310, respectively.

The segregation panel 140 pivots about a horizontal pivot axis 140A to facilitate maintenance on either side of the panel 140. Furthermore, the pivot axis 140A is offset from the face surface 142 of the panel 140 to allow the input coaxial cable 304 to bend freely from one side 142 to the other side 144 of the segregating panel 140. Further, the offset arrangement allows the signal splitting coaxial cables 306, 308, 310 to remain connected to the system component 322 and exit through the apertures 122, 162 when the segregating panel 140 pivots from a closed to an open position. Furthermore, the wrap guides 150, 152, 154, 156 control the bend radius of slack cables stored in the entry enclosure 100 to prevent damage to, or degradation to the telecommunications system cable 324. The telecommunications box 100 provides a standardized approach to combining the telecommunications system components 302, 322 in a single enclosure, while maintaining a safe and effective approach to handling, maintaining and modifying the system components 302, 322.

In the described embodiment, the panel 140 pivots along a horizontal pivot or hinge axis 140A, which is not coplanar with the panel 140. That is, the horizontal pivot axis 140A is offset from a face surface 142 of the panel 140. Finally, the panel 140 is configured to mount at least one of the telecommunications system components, e.g., a converter 302 and/or a splitter 322, along one side of the panel 140. In the described embodiment, the cable splitter 322 is mounted to the face surface 142 of the panel 340. While, in the illustrated embodiment, the converter 302 is mounted to the back wall 132 of the first housing portion 102, it should be appreciated that in some embodiments the converter 302 may be mounted to a backside, surface 144 of the panel 120.

For example, the pivoting panel 140 may include two protruding cam portions 101 that may be attached to cam receiving portions 101A of the base plate 130 such that the pivoting panel 140 may be pivotally repositioned to open and close the compartment cavity 126 underneath the panel 140. The pivoting panel 140 may a vertically extending wall that provides the pivoting panel 140 with a height such that the pivoting panel 140, when closed (closed meaning that the panel is substantially parallel to the back wall 132 of the first housing portion 102), provides a cavity/compartment 126 large enough to enclose the fiber optic component 302.

The pivoting compartment panel 140 may include raised partial ledges 103 configured with the cam portions 101. The ledges 103 may also be provided such that they are on opposite sides of an opening 105 that allows for cables/cords to enter the cavity 126 on either side of the pivoting panel 140. For example, the pivoting panel 140 splits the cavity 126 into two component compartments 126A and 126B. In FIG. 8, for example, the compartment 126B is hidden (but contains the converter 302), while the upper compartment 126A, which holds the component 322 is accessible. In this configuration, when closed (and/or locked), the second telecommunications system (coaxial system) is accessible, while the first telecommunications system (the fiber system) is hidden and/or protected from disturbance.

Figure 12:
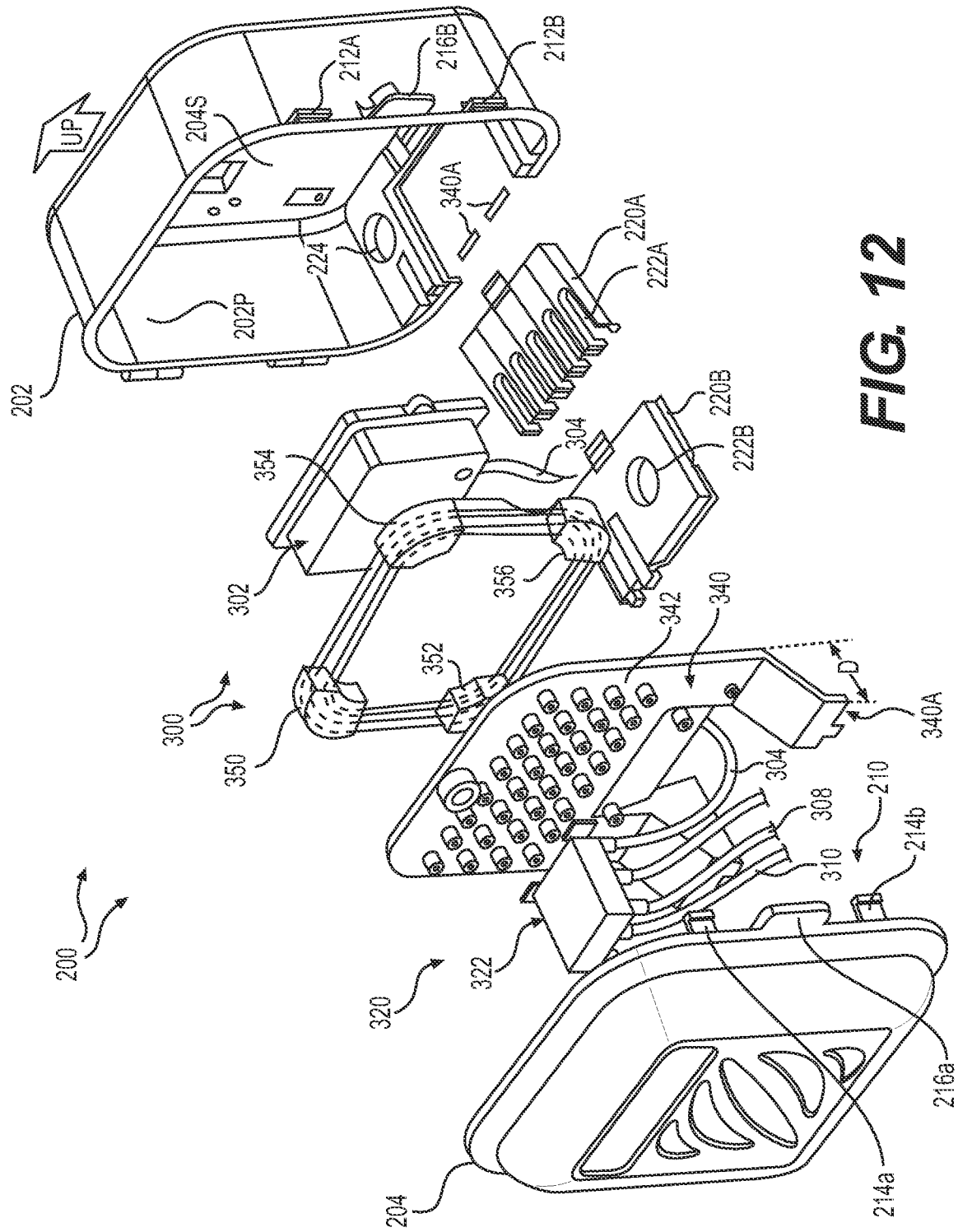
FIG. 12 shows an exploded view of a second embodiment of an exemplary telecommunications box in accordance with various aspects of the disclosure.
Figure 13:
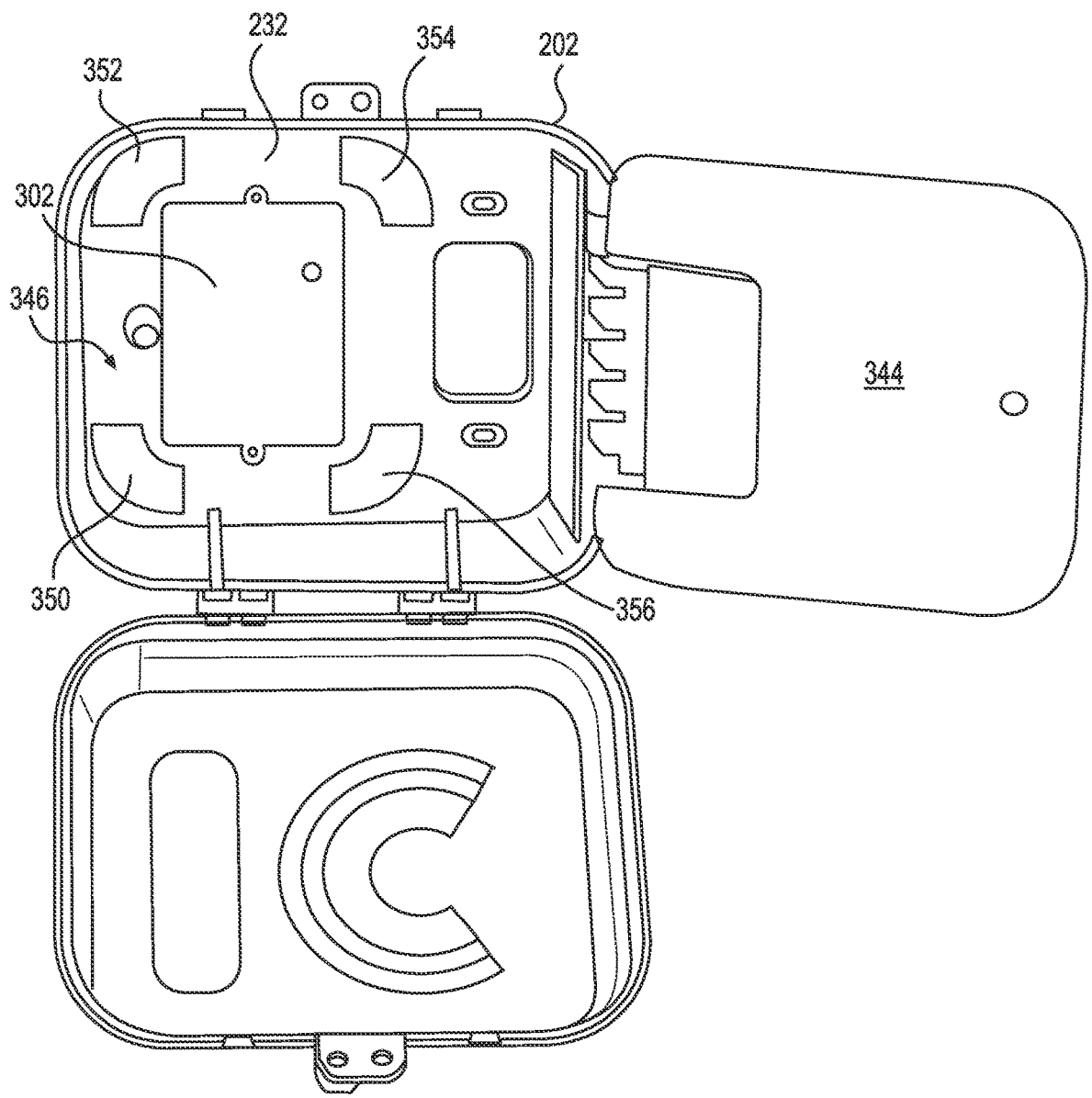
FIG. 13 shows a perspective view of the second embodiment of the exemplary telecommunications box with a segregating or hidden compartment panel in an open position and with components not yet installed.

FIGS. 12 and 13 illustrate a second embodiment of a universal multi-purpose compartmentalized telecommunications box 200 (or "entry box," "house box," or "fiber box") in accordance with various aspects of the disclosure. The second embodiment of the telecommunications box 200 is similar to the previously described box 100, but does not include the base plate 130 attached to the back wall 132 of the first housing portion 102.

As shown in FIGS. 12 and 13, in one embodiment, the telecommunications box 200 is configured such that the converter 302 is mounted directly to the back wall 232 of the first housing portion 202. The pivoting compartment panel 340 encloses a peripheral channel 346 formed between an inner peripheral surface 202P of the first housing portion 202 and a plurality of wrap guides 350, 352, 354, 356 extending from the back wall 232 of the first housing portion 202. The channel 346 is substantially rectangular in shape, conforming to the shape of: (i) the rectangular converter 302, (ii) the three peripheral sides 202P of the first housing portion 202 (projecting from the plane of the drawing sheet), and (iii) the backside wall surface 344 of the pivoting panel 340. The channel 346 produces a bend radius which is greater than the minimum bend radius of the fiber optic cable 324. It should be appreciated that the converter 302 may also be mounted to the under, or backside, surface 344 of the pivoting panel 340.

In this or any of the described embodiments, the first (or bottom) wall 220 of the first housing portion 202 may include a removable cable guide panel 220a, 220b. The cable guide panels 220a, 220b which are removable relative to the base 204 of the housing 200 to facilitate a variety of aperture configurations.

Figure 14:
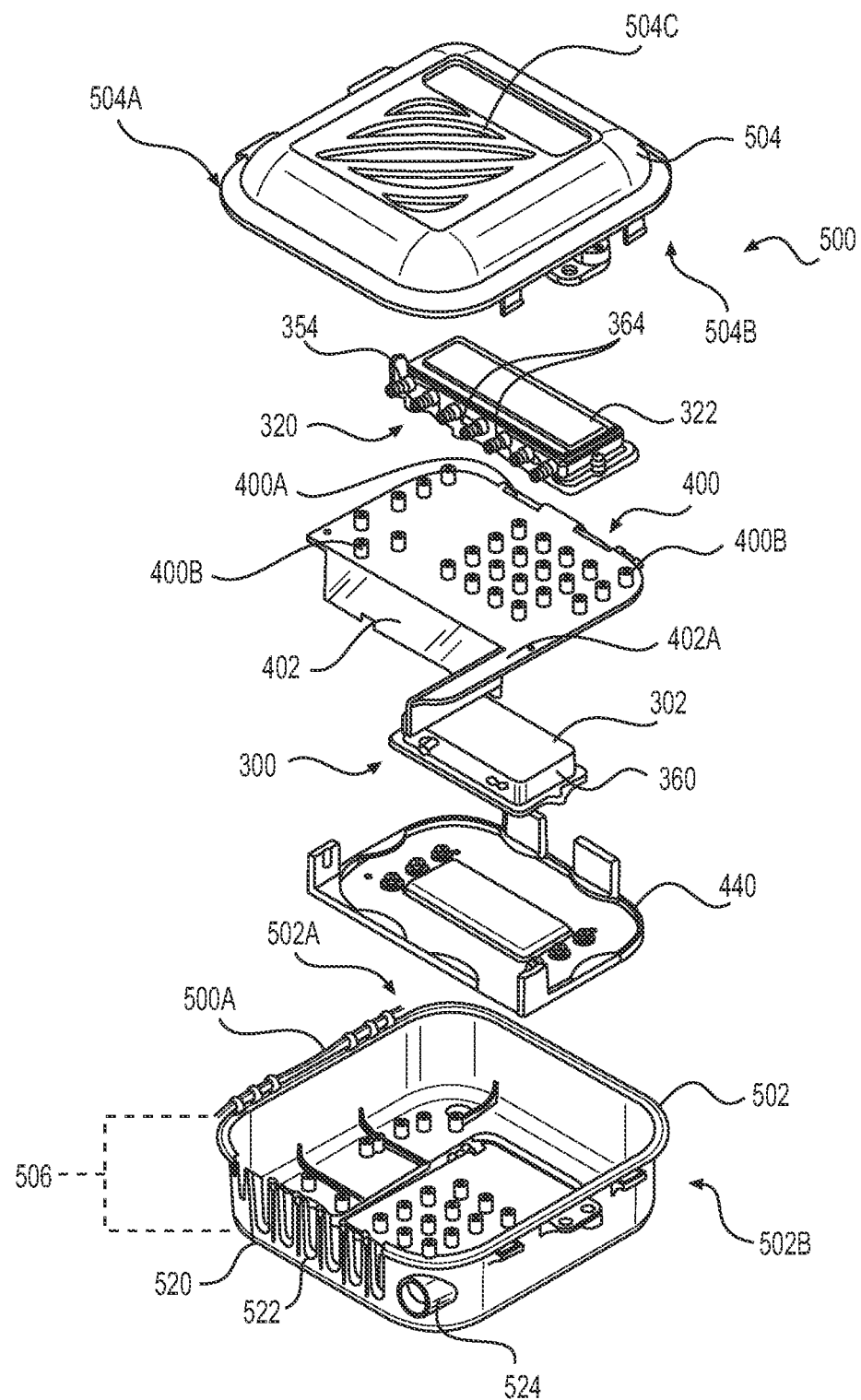
FIG. 14 shows an exploded view of a third embodiment of an exemplary telecommunications box in accordance with various aspects of the disclosure.
Figure 15:
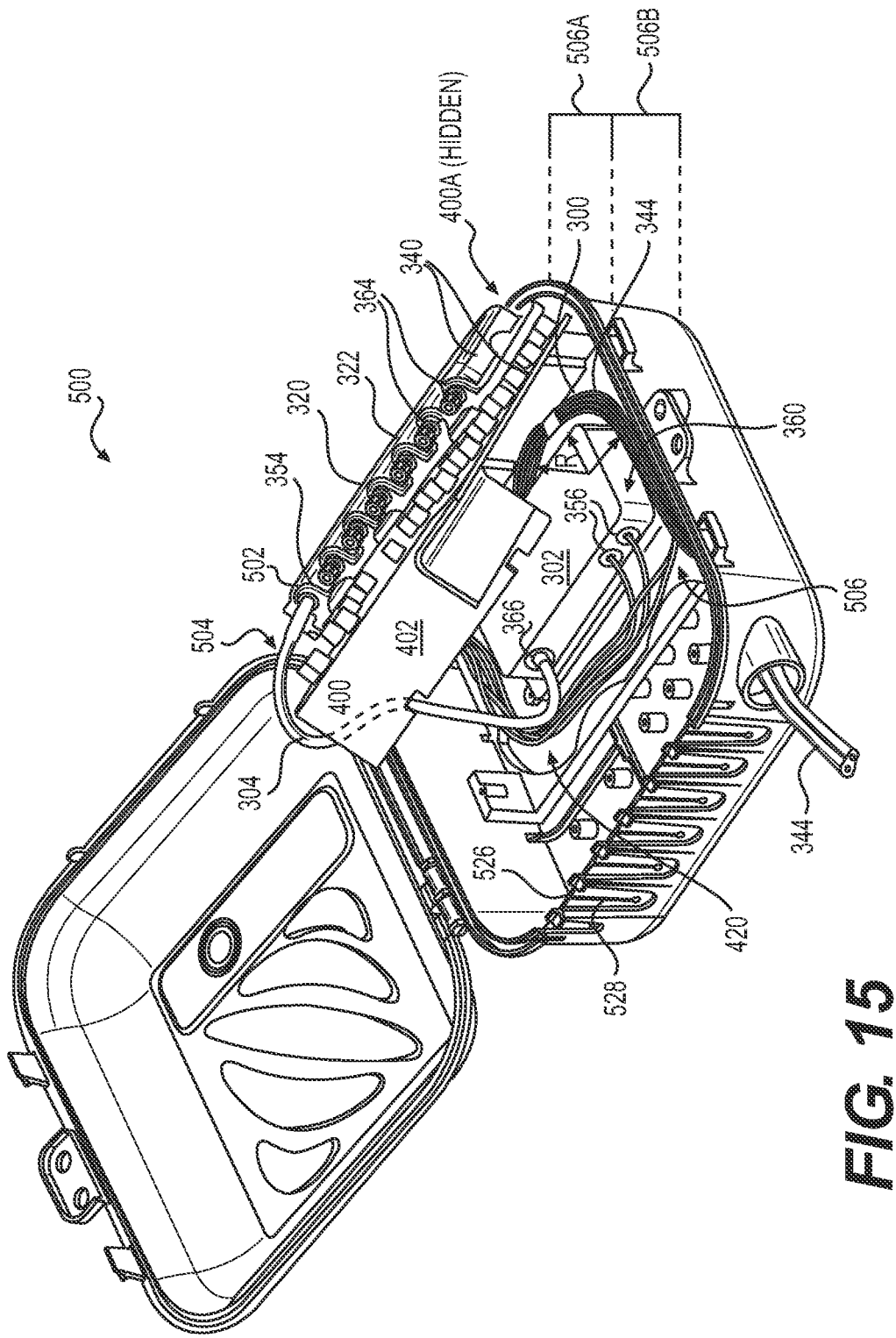
FIG. 15 shows a perspective view of the third embodiment of the exemplary telecommunications box with a segregating or hidden compartment panel in an open position.
Figure 16:
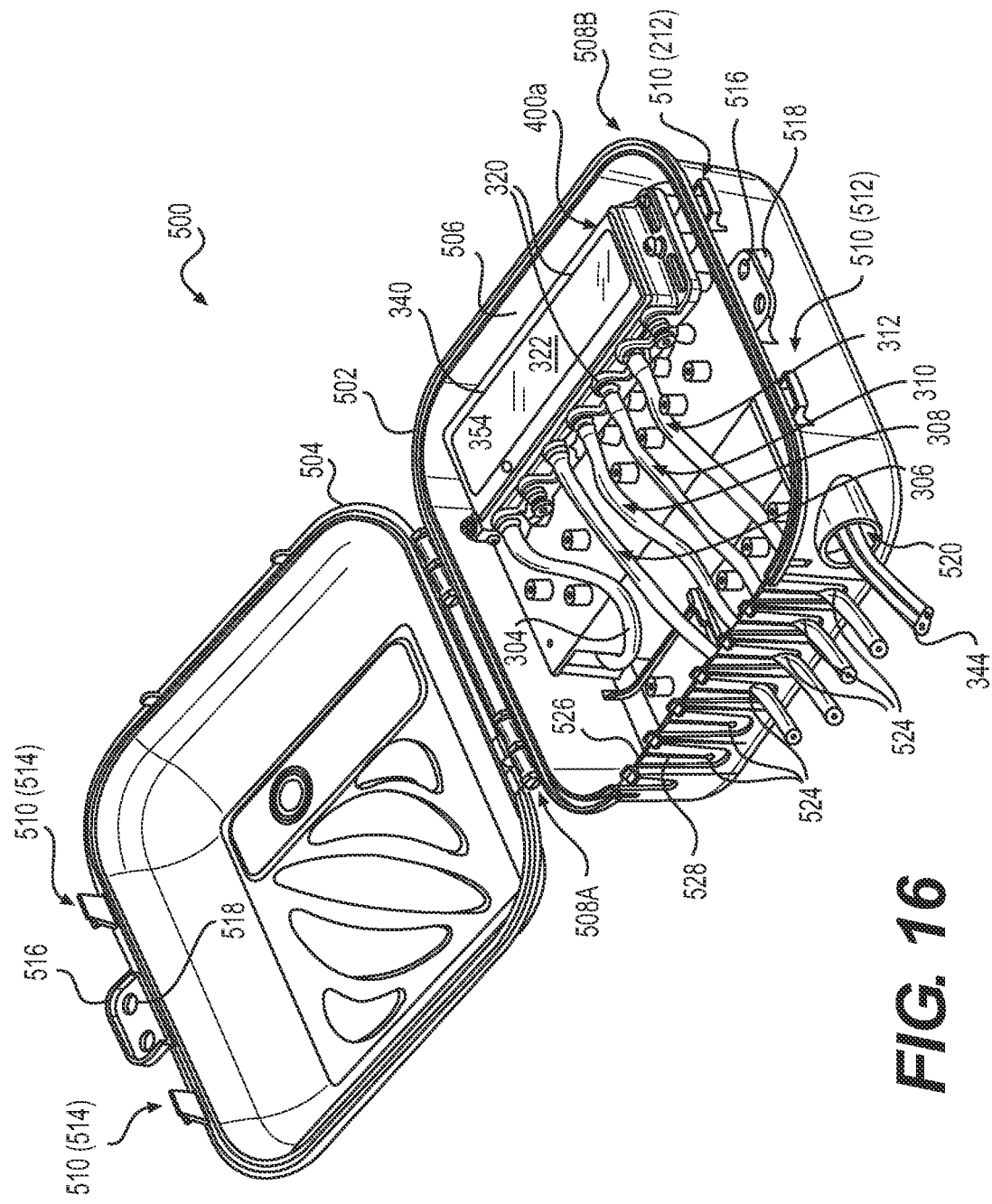
FIG. 16 shows a perspective view of the third embodiment of the exemplary telecommunications box with a segregating or hidden compartment panel in a closed position.

FIGS. 14-16 illustrate a third embodiment of a universal multi-purpose compartmentalized telecommunications box 500 (or "entry box," "house box," or "fiber box") in accordance with various aspects of the disclosure. In particular, FIG. 14 shows the parts of an embodiment of the telecommunications box 500 that may be configured to house multiple types of telecommunications system components, for example, fiber optic system components and RF system components. The telecommunications box 500 may comprise a housing including a first housing portion 502 and a second housing portion 504, that are permanently (or semi-permanently) pivotally joined together at corresponding first edges 502A, 504A allowing the box to pivotally open and close. For example, the first and second housing portions 502, 504 may be joined together by a box mounting hinge 500A that is configured to allow the first and second housing portions to pivotally open, such as, by a force that causes opposite corresponding second edges 502B, 504B of the first and second housing portions 502, 504 to move in opposite directions. The first and/or second housing portions 502, 504 may form an internal box cavity 506. As shown in the embodiments disclosed herein, a larger portion of the cavity 506 is located in first housing portion 502 than in the second housing portion. It should be appreciated that the cavity 506 may be split between the housing portions 502, 504 and/or modified as desired). When the telecommunications box 500 is closed, the box 500 forms an enclosure that can provide protection from weather, fire, and/or theft of two or more telecommunications installation systems (and their respective installation components).

As shown in FIG. 14, the cavity 506 of the first and second housing portions 502, 504 may be configured to house/enclose components (fiber optic converter 302 and a cable splitter 322) of two different types of telecommunications systems 300, 320. The fiber optic converter 302 and cable splitter 322 may be separated by panel 400. Accordingly, the telecommunications box 500 may provide both fiber optic and coaxial cable systems 300, 320 each having at least one different type of telecommunications system component 302, 322.

The lower housing portion 502 (or upper housing portion 504) may further include a wall 520 having one or more elongate apertures or slits 522 to receive telecommunications cables while preventing the infiltration of debris (e.g., leaves, soil, pollen) into the cavity 506. The openings or apertures 522 of the housing 500 may employ a simple gasket (not shown) through which a fiber cable 344 may be fed or a bulkhead connection (also not shown) may be employed. A bulkhead connection may employ a pre-terminated fiber module installed between an internal wall/bulkhead and the internal fiber-optic component (converter 302). Upper housing 504 may be further provided with ovalshaped, diagonal openings for ventilation 504C. The secure enclosure or enclosable box 100 may be configured to provide a compartment clearance so as to provide universal flexibility when choosing components, irrespective of the service provider. This modular system may be pre-installed and/or pre-fabricated (to be provided to a technician for field installation).

As shown in FIGS. 14-16, the housing 500 may include a segregating compartment panel 400 that is configured to define a compartment within the box cavity that separates the coaxial splitter 322 from the fiber optics converter 302 (although other components may be substituted as necessary). The segregation panel 400 may be configured to allow one of the component 302, 322 to be mounted to either side of the panel 400 (shown in FIGS. 14-16 configured to mount component 322 to the upper surface of panel 400).

One or more panel mounting hinges 400A may be provided to pivotally attach the segregation compartment panel 400 and a component compartment base member 440. The panel 400 may be provided with a pivoting mechanism. For example, panel mounting hinges 400a. The edge of the box where panel mounting hinges 400a are located may be an edge that is different than the edge 508a (FIG. 16) where box mounting hinges 500a are located, but the panel mounting hinges may be provided on any edge of the housing portion 502. The panel hinge 400a may be configured to allow the panel 400 to open by pivoting relative to a base member 400 (thereby allowing access to components mounted beneath the segregating compartment panel 400 or to the underside thereof). As such, the hinged panel configuration of the telecommunications box 500 provides the service technician with additional options/choices when choosing telecommunications equipment/components and the manufacturers of such equipment/components. Furthermore, the telecommunications box 500 provides a standardized approach to combining the telecommunications equipment/components 302, 322 while maintaining a safe and effective approach to handling, maintaining and modifying the components 302, 322.

FIG. 14 shows the hidden component compartment upper panel or door 400 may be configured to attach to a hidden compartment base or floor 440 that are each configured to have side edge surfaces that conform to the shape of an inner surface of the lower housing 502. The component compartment base member 440 may have an external lower back (non-mounting) surface that is configured to rest substantially flush with the inner surface of housing 502. Further, the base member 440 may have two sets of vertically protruding portions (four shown in FIG. 14). The vertical protruding portions may (as discussed below) be configured to provide a boundary ensuring a minimum permissible bend radius of fiber-optic cables and/or include pivotally movable mounting portions (e.g., hinges) at the protruding end of the vertically protruding portions. Moreover, as shown in FIG. 14, the base member 440 may be configured to conform to mimic the shape of lower surface 502. The hidden compartment upper panel or door 400 may include mini protruding portions 400b that are configured to allow for installation of a specific type of telecommunications component (a coaxial configuration is shown, but other telecommunications configurations may be desirable).

Moreover, hidden compartment upper panel or door 400 may be provided with an extending side portion 402, which may extend back toward base member/compartment floor 440 such that the extending portion 402 of the upper panel 400 touches or nearly touches the compartment floor 440. In this configuration, the panel 400 may further include a cord extension portion 402A, which may extend the panel 400 towards the opening 520. In this respect, the compartment panel 400, with extending portions 402 and 402A may completely (or nearly completely) enclose all components directed towards the first telecommunications system 300 (e.g., fiber converter 302, other fiber components). Thus, the upper panel 400 and lower compartment floor (base member) 440 provide partitioning or segregation of the first telecommunications system 300. Thus, a telecommunications service provider, may be able to install components outside of or on top of (mounted on top of) panel 400 without worrying about component 302 being disturbed (i.e., a coaxial cable only installer may install coaxial cable in a fiber box without being allowed access to the fiber portion of the box). In FIG. 14, the hidden compartment base or floor 440 may be configured to be mounted by the component 302, such as, including two sets of three protruding cam portions.

To facilitate retrofitting/modification of existing entry boxes, it may be desirable to produce a pre-fabricated retrofit kit or assembly comprising: the base plate 440 (see FIG. 14) inserted within and affixed to the first housing portion 502 and a segregation panel 400 hinge-mounted to the base plate/member 440. The axis of the compartment hinge 400A of the segregation compartment panel 400 may be orthogonal to the hinge-axis of the box mounting hinge 500A. In this embodiment, the fiber optic converter 302 may be affixed to the base plate 440 while the coaxial cable splitter 322 is mounted to the segregating panel 400. It will also be appreciated that the fiber-optic converter 302 may be affixed to the underside of the segregating panel 400.

The features of the third embodiment in FIG. 14 are shown in more detail in FIGS. 15 and 16. In particular, FIGS. 15 and 16 show how the panel 400 of the house box 500 may provide an upper (easily accessible) compartment 506A and an internal (hidden) enclosable component compartment 506B. FIG. 15 shows the upper component compartment 506A being accessible when the panel 400 is in an open configuration (the panel 400 has an unhinged, unmounted end opposite the mounted hinge 400a that is raised vertically above the mounted hinge 400A).

As shown in FIGS. 14-16, the panel 400 may be configured such that components of a first telecommunications system 300 (e.g., fiber optic converter 302) may be disposed within the internal enclosable compartment 406 and, thus, segregated from a second separate type of telecommunications system 320 (e.g., coaxial cable components, such as, splitter 322, amplifiers, transformers, power converters, etc.) resting above the nested compartment 506B and separating compartment panel 400. The segregation of respective components from different telecommunications systems prevents, for example, a service technician from inadvertently interfering with, damaging, or degrading the performance of the components within the internal enclosed compartment. In some embodiments, the telecommunications system component (the converter 302) may be provided along aside of the panel 400.

In FIG. 15, the panel 400 is shown as mounted on compartment base member 440 via hidden mounting hinges 400A. The separating compartment panel 400 of FIGS. 14-16, segregates the first and second telecommunications systems 300, 320 by providing a component compartment (internal nested cavity) 506B within the larger enclosure/box cavity 506. In some embodiments, the compartment 506B may be a size that is large enough to house a converter 302 and a channel 420 (described below). More specifically, the panel 400 may provide a component compartment 506B that segregates components related to the first telecommunications systems 300 (e.g., converter 302 and fiber optic input cable 344 which is disposed through the input aperture 520, and may be forced to travel around converter 302 via channel 420) from the remaining components (which may be directed towards another different telecommunications system), such as, splitter 322.

The panel 400 (as shown) may be configured to enclose a peripheral channel 420 formed between an outer periphery 360 of the fiber-optic component 302 and the lower housing portion 502. More specifically, the channel 420 may be a substantially rectangular shaped channel that ensures a minimum bend radius R (at each of the four corners of the rectangular channel 420) which is greater than the minimum bend radius r of a fiber optic cable (e.g., fiber optic cable 344).

To ensure the bend radius is proper, the channel 420 may provide a channel that encircles the component 302. The channel may be configured to ensure the fiber optic cable 344 is properly shaped by utilizing three sides of the lower housing 502 in conjunction with the extending panel portion 402. In other words, the channel 420 may have a width dimension (i.e., the dimension between fiber-optic system component 302 and the lower housing portion 502, and/or the vertical wall 402 of the panel 400) which produces a minimum bend radius R (at each of the four corners of the rectangular channel 420) which is greater than the minimum permissible bend radius r of the fiber optic cable 344. That is, the geometry of the channel 420 allows the fiber optic cable to follow an arcuate path P or bend R which exceeds the minimum bend radius r of the fiber optic cable 344. The bend radius R of the channel 420 must be greater than the minimum permissible bend radius r of the fiber optic cable 344 to prevent signal losses as the optical signal negotiates the arcuate path, curve or bend at each corner of the channel 420. As the bend radius R of an optic fiber or filament decreases, the incident light energy is not fully reflected internally of the optic filament. That is, the light energy is refracted out of the filament causing a portion of the light energy to be absorbed, or a portion of the signal to be lost. As the level of refraction increases, signal quality decreases.

FIG. 16 shows a perspective view of the first embodiment of the secure enclosure or enclosable box of FIG. 15 with the segregating or hidden compartment panel 400 now in a closed state or position. The closed state/position is a state in which a component 322 for the second telecommunications system 322 may be installed while access is prevented/restricted to the component of the first telecommunications system 300 (hidden in FIG. 16). The optic signal carried by the cable 344 may be converted to a digital signal by the fiber-optic converter 302.

As shown in FIG. 16, fiber optic converter 302 may be configured to convert an optic signal into a digital signal for transmission. The digital signal may be conveyed to the cable splitter 322 from the converter 302 via a short coaxial input cable 304. The cable splitter 322 may split the received signal into multiple transmission signals, which may be subsequently output via coaxial output ports 364 attached to, for example, coaxial cables coaxial cables 306, 308, 310, 312 that exit the housing 500 through output apertures 524 (such that they may be fed to the connections at the nearby house or residence). The component 322 may comprise a coaxial input port 354, which may be configured to receive a signal from connected cable 304 from the fiber optic output port 366. Further, the fiber optic input port 356 of the fiber optics component 302 may be configured to receive a fiber optic input signal from fiber optic cable 344, which may be wrapped around the outer periphery 360 of the component 302. The second telecommunications system 320 may be a coaxial cable system 320 that includes a cable splitter 322 configured to split a signal received via the input cable 304 into multiple signals exiting via corresponding output cables 306, 308, 310, 312. Accordingly, the secure enclosure or box 100 may provide both fiber optic and coaxial cable systems 300, 320 each having at least one different type of telecommunications system component 302, 322.

As shown in FIG. 16, the housing portions 502, 504 may provide enclosure (box) mounting hinges along one edge 508A and include aligned locking tabs 510 along the opposite edge 508B (to facilitate opening/closing of the secure enclosure 100). The locking tabs 510 may be a molded U-shaped opening 512 on the opposite edge in one of the housing portions 502, 504 and a resilient clasp 514 integrally formed in the same opposite edge of the other of the housing portions 502, 504. The locking tabs 510 may be augmented by a lock hole fitting portion 516 having aligned apertures 518 configured to allow the opposite end of the housing portions 502, 504 to be closed/fastened together, such as, by a padlock. In some embodiments, the panel 400 may be configured in a similar manner, such that, the panel may have an opening/clasp mechanism to open the compartment. In other embodiments, the internal compartment 506B may be accessible via a back panel 502A. In such an embodiment, the panel may be permanently affixed so as to not provide easy access, via, for example, a tab/opening mechanism.

Figure 17:
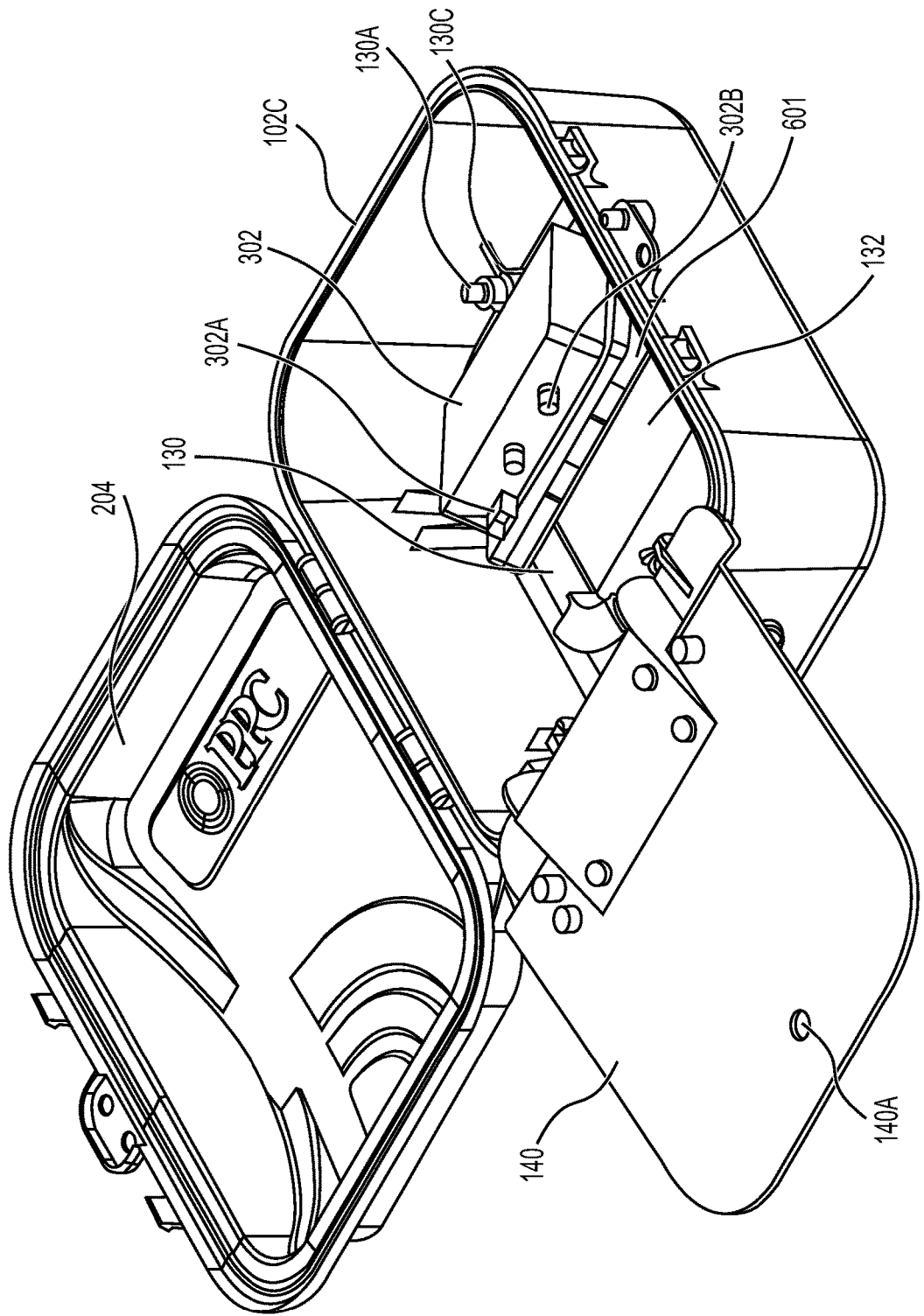
FIG. 17 shows a perspective view of a fourth embodiment of the exemplary telecommunications box with a segregating or hidden compartment panel in an open position and the platform in a testing/cleaning configuration.

Furthermore, as illustrated in FIGS. 17-20, in a fourth embodiment, the base plate 130 may be pivotably coupled to a component platform plate 601. The component platform may be pivotable so as to angle away from the back wall 132, or, alternatively, fixed so as to angle away from the back wall 132. FIG. 17 shows a perspective view of the fourth embodiment of the exemplary telecommunications box with a segregating or hidden compartment panel 140 in an open position and the pivotable component platform 601 in a testing/cleaning configuration. Preferably the pivot axis is horizontal, and the platform is preferably configured so that the bottom the tilts away from the back wall. However, alternatively, the pivot axis could run vertical and the platform could swing away from the backwall such that a left or right side of the platform.

The hinge could alternatively be provided on the right-hand or left hand edge side. In this configuration, with certain ONU's, the platform could swing out of the box (like a refrigerator door). Alternatively, the ONU could be mounted upside down from the drawings.

In FIG. 17, security device 130A may be configured to hold the deck 140 in place (to prevent access as discussed above), when the deck 140 is placed on the security device 130A and secured. The hole 140A in the deck 140 is aligned with the security device 130A so that when the deck rests against the buttresses, the security device 130A protrudes through the hole 140A in the deck 140. The protruding members 130C (retention members) may be configured so that the cable is wrapped around the base member so as to make restriction behind the back wall. The slack fiber cable may travel a minimal distance around the base member or loop all the way around one or multiple times. The deck and the buttresses on the inside of the back wall keep a possible big loop of the cable from sneaking up and being pinched the cable and/or the deck closing on the cable. Of course, the security device could be another device besides a close-and-latch type security device.

Of course, other components may be used. For example, the dual component house box may include DSL twisted pair cable coming in, and RF coming out. Alternatively, could have Fiber Optic coming in, and twisted pair on the second level coming out. The house box is not necessarily Fiber IN, and RF Out (although the exemplary embodiment in the FIGS. shows such configuration). If using RF though, at the very least would need (with current communication standards) an RF transceiver, and optionally an RF splitter. Another example, is one RF in, one RF out configuration, and also could, alternatively, have electrical nature elements (e.g., telephone or Ethernet). In this respect, not all possible useful components have an optical port for testing. For example, instead of the ONU, the component mounted to the component platform could be a splicer instead. However, as discussed there are other uses (e.g., ease of connecting RF components, cleaning) beyond just the testing.

The lid could also be a shallow lid version that does not have the two inches or so of depth. The deck 140 may sit on the top of the buttresses 102C along the first housing portion 102. Some components may fit within the shallow lid. However, many components require extra lid depth with the coaxial cable coming in and out of the component. Thus, some adjacent horizontal room for looping, for example, the coaxial cable around the components themselves. When deck 140 closes, the second housing portion 104 rests on the buttresses 102C that may extend all the way around the first housing portion 102, or, alternatively, only a portion that is necessary for support.

As shown in FIG. 17, the component platform may be, for example, a plate (e.g., a current plate) that is configured to act as a pivotable component platform 601. The pivotable component platform plate 601 may be snapped into the back wall 132 and may make the area where the component 302 (e.g., fiber node ONU) is attached adjustable in one direction such as the z-direction. Typically, a fiber optic component 302 (also referred to as an ONU (mini node)) may be mounted inside of the first compartment (near the back wall 132) such that the optical ports of the ONU face downward, which facilitates good cable management and avoids contamination of the ports with debris or moisture due to gravity. However, once the ONU is installed, it may be difficult to access the optical port 302A of the ONU 302 for occasional testing, visual inspection or cleaning without un-mounting the ONU (e.g., fiber component 302).

Further, the house box may be in-home network MOCA-compliant ("Multimedia Over Coaxial Alliance"). In this respect, the component may be angled so that it maintains the coaxial MOCA requirement for the cable. The point of entry filter may be for any home over 1200 MHZ (MOCA may start at over 1100 MHz) so as to stop the outside world from seeing. The house box may secure and terminate the fiber that feeds into a big loop of fiber. The big outdoor fiber casing may be terminated to the box (via a part of the plastic of the box, or a hose clamp holding down). The smaller interior of the cable is the fiber facing, which wraps around the fiber management tabs as part of the base plate, Finally, the fiber comes out of there and plugs into the ONU. All of the cable management may be kept at a very low height (e.g., only an inch or so from the box) to provide a compact design.

Alternatively, there could be a ground block embodiment, for example, where a splitter is not required because the service does not need to be split, or because the splitter is elsewhere. A ground block is used as a safety standard in the United States, and is where the cable system is connected to the house ground. Generally, this may be located near your electrical meter (e.g., a ground wire running to a meter).

The inner compartment may be only slightly bigger than the ONU itself and maintain the proper bend radiuses for the fiber and RF cable. For example, no more square footage than double the size of the ONU in any one direction. The thickness of the entire house box may be not much more than the ONU, RF component and the panel. That is, the ONU, RF component and panel may be stacked on top of each other. The entire house box with lid closed may be 4 or 5 inches deep (preferably not more than 6 or 7). The other dimension may be 9 inches by 12 inches or 11 inches wide by 12 inches. The bend Radius may be 4 inches (a circle of cable can't be any smaller than 8 inches).

The pivotable component platform 601 may pivot relative to the back wall 132 of the housing portion. The pivotable component platform 601 may be attached to the base member 130, which is attached to the back wall 132 of the housing portion, or, alternatively, the platform 601 may be directly attached to the back wall 132 (the latter for ease of manufacturing/assembly). As discussed in the FIGS. below, different structures/configurations may be used to provide the pivoting configuration.

As discussed above, once the fiber optic mini-node 302 (ONU) is installed in the hidden compartment, it may be difficult to access the optical port 302A for occasional testing, visual inspection or cleaning without un-mounting it. The pivotable component platform 601 solves those problems by providing a pivotable, movable feature for the ONU mount that pivots the orientation of the ONU such that a user is provided un-obstructed access to the optical ports 302A without having to un-mount it, thereby providing more convenient access to, for example, the optical port 302A for testing and/or inspection.

The deck 140 prevents access to the first type of component (e.g., the fiber optical component). In this respect, security device 130A may be provided in base plate 130 to require use of a special tool to access the ONU. For example, the special tool (not shown) may require a tube with two prongs to retract. In addition, or alternatively, a locknut requiring a special locknut tool could be used. The main box closed using the snap, and/or putting a security connector on that post. As shown in FIG. 17, by locking the security device 130A, the deck 140 may be held into place to prevent unauthorized access to the internal compartment, and more notably, the ONU 302.

Figure 18:
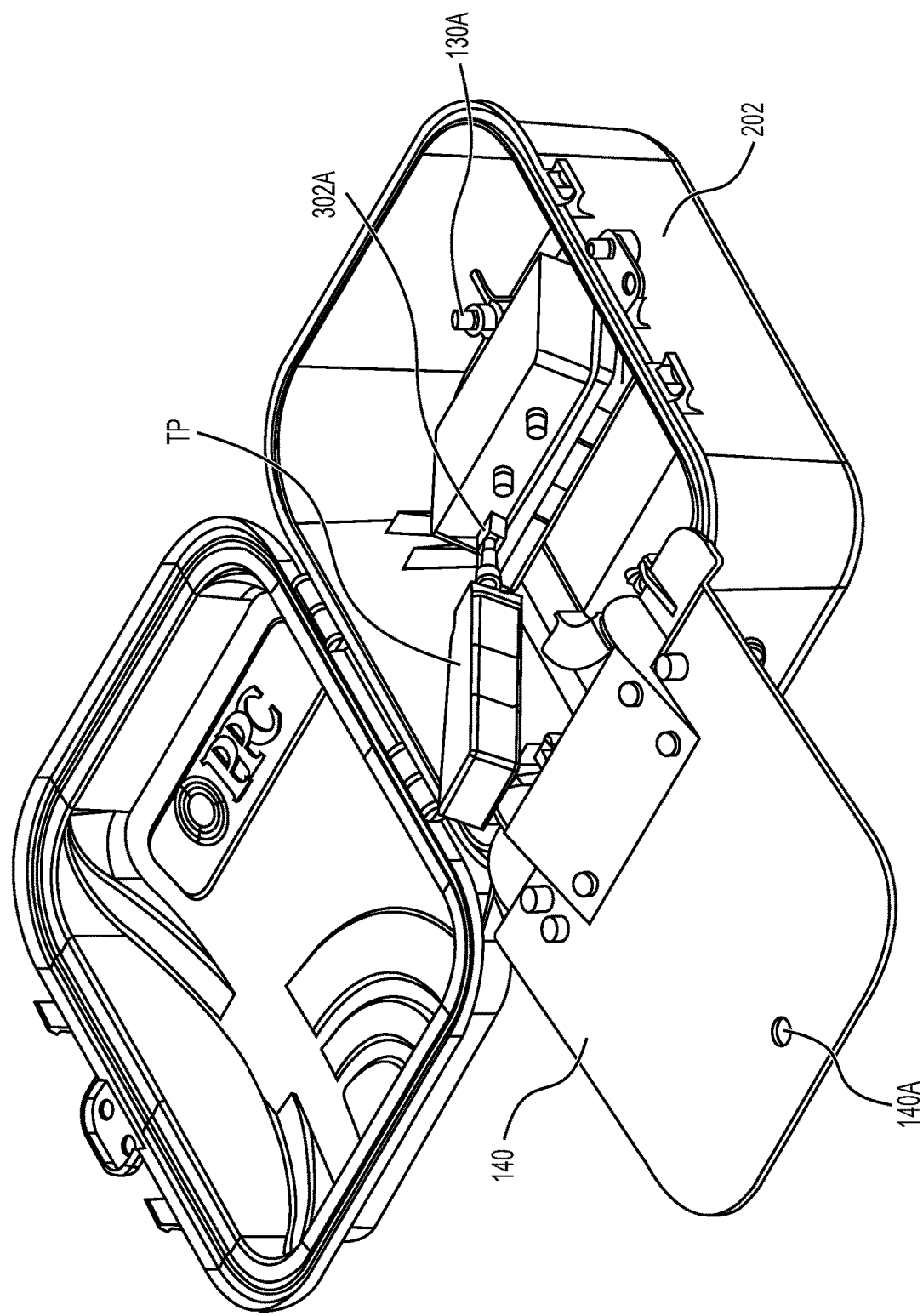
FIG. 18 shows a perspective view of the fourth embodiment of the exemplary telecommunications box with a segregating or hidden compartment panel in an open position and the platform in a testing/cleaning configuration with a probe attached.

FIG. 18 shows a perspective view of the fourth embodiment of the exemplary telecommunications box with a segregating or hidden compartment panel 140 in an open position and the platform 601 in a testing/cleaning configuration with a probe TP attached. In these embodiments, if, for example, a fiber optics transceiver 302 is attached to the pivotable component platform 601, the fiber optics transceiver 302 may pivot so as to swing outwards allowing for more clearance to work with the port 302A on the transceiver 302. Thus, for example, an experienced technician can connect a testing probe TP to the fiber optics port 302A of the transceiver 302 without having to remove the transceiver 302 (e.g., having to unscrew the transceiver). See, e.g., FIG. 18.

The pivotable component platform 601 may be comprised of cut-outs along three sides of the ONU mounting space along the top space to allow for the component platform 601 to be tilted outward away from the plane of the mounting and towards the technician. For example, FIGS. 17 and 18 show the platform 601 mounted on a base member 130 and tilted out away from the back wall 132. The cut-outs may be created by a "tear-out" feature so that the pivotable component platform, which is used as a mounting plate, stays solid until it is necessary for a user to access this feature. The tear-out may be already separated across the hinge line. Alternatively, the pivotable component platform could use a snap-in configuration to snap the platform into the base member such that a bottommost portion is inclined away from the side walls (and out into the open for access).

In this configuration, the skilled technician may then temporarily disconnect any optical cable connectors, and inspect and/or clean the optical port 302A and/or transceiver 302 with commonly available tools such as a fiber optic visual inspection probe TP or a "one-click" style port cleaner (not shown).

Figure 19:
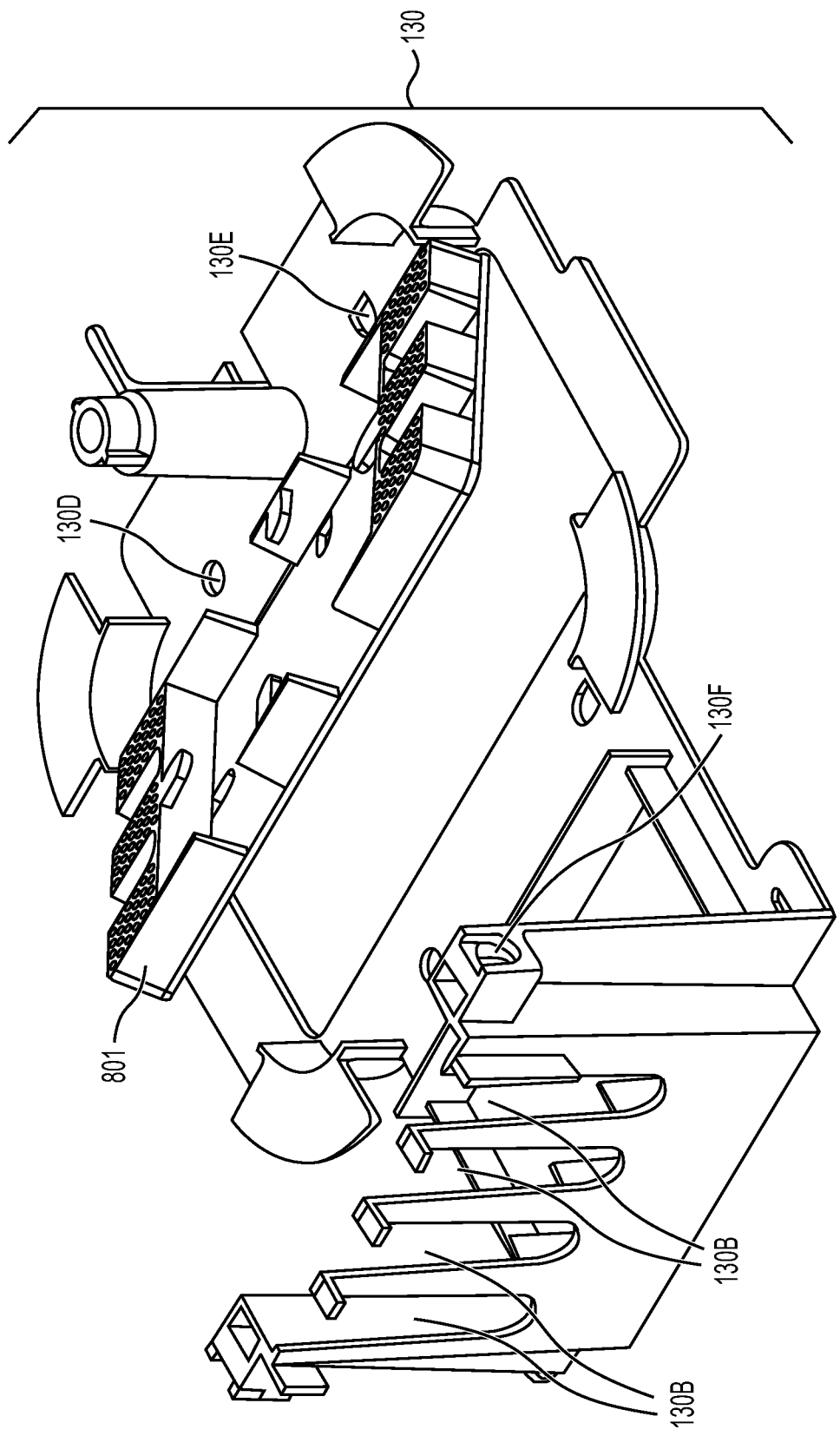
FIG. 19 shows a perspective view of a base member of the third embodiment of the exemplary telecommunications box in a testing/cleaning configuration.

FIG. 19 shows a perspective view of a base member 130 of the third embodiment of the exemplary telecommunications box in a testing/cleaning configuration. FIG. 19 shows the base member 130 with a connected platform 601 tilted away from the base member 130. Mount hole 130D and alignment tag 130E may be provided in the base member. However, there may be more or none of these holes 130D, tags 130E based on the desired mounting configuration. Hinge points 130F may be provided in the base member for the deck 140 (so that the deck may open in close in a pivoting manner) The pivotable component platform 601 may be connected to the back wall 132 or the base plate/member 130. The connection of the platform 601 with the back wall 132 or base plate 130 may be via a connecting portion 601A. The connecting portion 601A may be one or more hinges formed with a living hinge design in a molded plastic base plate 130. Alternatively, connecting portion 601A may be an area of the first housing portion or second housing portion that flexes. FIG. 19 also shows that the platform or base member may have a few posts. Some may have a snap feature so that you would not need to put screws into the housing portions/box itself.

Alternatively, instead of being pivotable, the platform may be fixed in an inclined manner such that the component platform is provided in a testing/cleaning configuration without pivot. The platform could be separate without being hinged and could be removable/replaceable (e.g., via snapping into place). That is, the platform could be fixedly-mounted to come away far enough so that does not need to pivot to have the appropriate cleaning angle. Snapping in and out would still be more convenient than unscrewing/unmounting the component. As long as one hand can access the port, and the other can perform the measurement it is helpful to have the angled (without unmounting) configuration. Thus, snapping it in and out could access port of the component. The discussion of FIGS. 17-20 is directed at the pivotable component platform, but the fixed configuration could correspond to the pivotable component platform's post-pivot configuration (so as to angle away from the back wall 132).

Another embodiment, is an internally sprung configuration (e.g., by special materials with outward bias, or an internal spring). In the spring configuration, there could be a latch (or not) such that the platform has only two (A) and (B) positions. A latch may be used to compress the spring via the platform. The latch may be released to push the component to the other position. The kickstand may be the most cost-effective option.

For example, the living hinge could be used instead of two types of parts that snap together. The living hinge may tilt upward and use a kickstand so as to work around the cable orientation. However, the platform may be configured such that only a portion of the platform hinges. For example, there may be a platform provided with a center trunk that hinges while the remaining portion of the platform stays fixed. The center truck being where the component is mounted to the platform. For example, the base member shows a box of holes, and the whole area with the box of holes pivots instead of just some of them pivoting. However, could have a smaller area (e.g., half a dozen) that pivots, or two strips that pivot. As long is sufficient to have one component (e.g., the ONU) to pivot the bottom portion can stay put. Only a part of the entire support structure (the mounted part) could hinge.

The hinged component platform may have the hinge point at a top part of the deck (the bottom part being in a gravity direction when mounted, the tops of FIGS. 17-20 are the top part). The hinges may pivot the component platform so as to clear the side walls of the first housing portion. Further, because of the compact structure of the house box, it is preferable to have the platform pot out and have an ONU mounted there. In other words, by design, there is not a lot of room between the lid and the RF equipment (a negligible amount of clearance such as a few inches 1-3).

As shown in FIG. 19, there may be holes provided in the base plate that align with the back wall. Once installed there may be holes for snapping the base plate into the box. When secured to another structure (e.g., telephone pole, tree) later on, both the base and the mount plate are mounted together. In addition, the apertures 130B may allow for cables (e.g., coaxial cables) to exit the house box in a straight line fashion. A piece of foam may be placed so as to cover the channel shaped apertures 130B. The piece of foam may be resilient so that it will contour around the cable on both sides, and will not deform around the cable.

Figure 20:
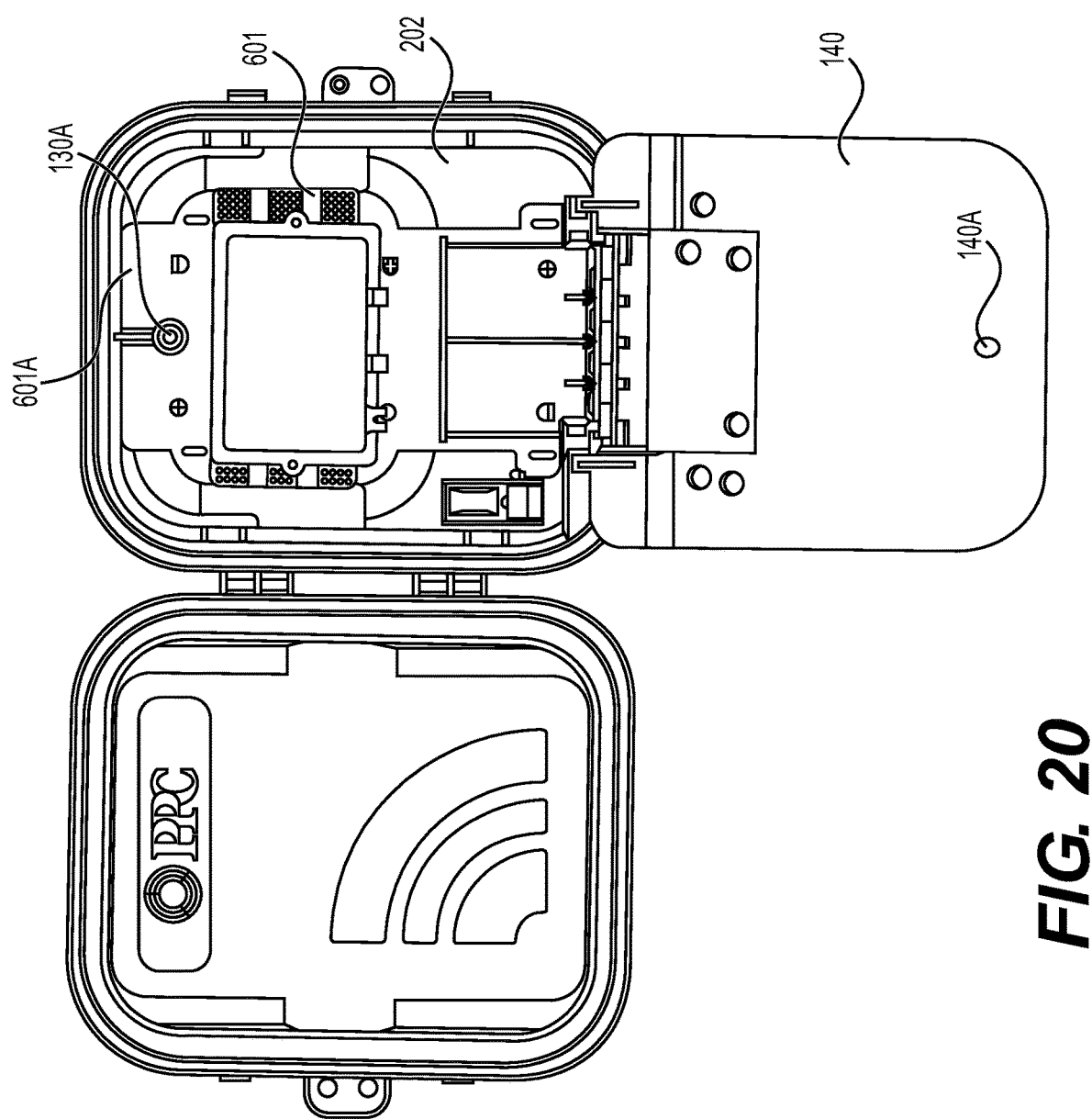
FIG. 20 shows a perspective view of the fourth embodiment of the exemplary telecommunications box with a segregating or hidden compartment panel in an open position and the platform in an original closed position.

FIG. 20 shows a perspective view of the fourth embodiment of the exemplary telecommunications box with a segregating or hidden compartment panel 140 in an open position and the pivotable platform 601 in an original closed position. To provide the pivoting configuration the base member may include a pair of mounting molds that hinge such that a portion of the panel hinges. If the ONU hinges, it makes it easier to use the testing equipment (probe), and makes it easier to connect the RF connectors without bothering the power and/or RF connection. Further, when tightening for example the RF connection with two fingers, there is not much room behind in the compact house box arrangement, and the bias of the RF connection elements may make it difficult to turn the threads 302B. So the pivoting/inclining of the bottom portion away from the house box would allow the two fingers to more easily tighten the RF connection (as an example).

In FIG. 20, the ONU is attached to the platform and the main deck 140 is folded. The ONU is installed, but the RF is not in place or is hidden from view by the deck 140. The platform 601 may also be configured to provide a kickstand connected to the base plate 130 or back wall 132 that allows the pivotable component platform 601 to rest in a testing/cleaning configuration. The kickstand may include a latching mechanism that allows the kickstand to engage with the platform 601 so that the platform rests in a testing/cleaning configuration. The latching mechanism may be utilized to prevent unintended movement of the platform 601 when in the cleaning configuration.

However, as one of ordinary skill would appreciate, the fixed mount that is angled configuration could be structured to provide the same angled testing configuration.

For these reasons, the discussion of FIGS. 17-20 is directed at the pivotable component platform, but the same concepts/structure could also be applied to the fixed mount that is angled configuration.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. An access control device comprising:
   an optical fiber configuration base member configured to be coupled to an optical fiber component and to arrange the optical fiber component so as to create a peripheral optical fiber cable path around at least a portion of the optical fiber component;
   a component platform configured to be pivotally connected to the optical fiber configuration base member, the component platform being configured to have the optical fiber component mounted thereto such that the optical fiber component pivots with the component platform; and
   an access control panel member configured to be coupled to a radio frequency (RF) cable component, the RF cable component being configured to be coupled to one or more RF cables,
   wherein the access control panel, when in a first access position, blocks access to the optical fiber component, while providing an operator access to the RF cable component,
   wherein the component platform is connected to the optical fiber configuration base member via a connection portion that permits the component platform to pivot to a configuration such that the component platform is tilted away from a wall of the base member, and
   wherein the optical fiber component is mounted to a side of the component platform facing away from the wall of the base member.

2. The access control device of claim 1, wherein the peripheral optical fiber cable path is configured to receive slack optical fiber cable, encircle the slack optical fiber cable around a portion of the optical fiber component, and shape the slack optical fiber cable so as to be connected to the optical fiber component while preventing the slack optical fiber cable from being less than a minimum optical fiber cable bend radius of the slack optical fiber cable when the slack optical fiber cable is connected to the optical fiber component.

3. The access control device of claim 2, wherein the slack fiber cable wraps around at least three quarters of the optical fiber component, which is a fiber optic converter, within the optical fiber configuration base member.

4. The access control device of claim 2, further comprising wrap guides configured to extend from the optical fiber configuration base member so as to control the bend radius of the slack optical fiber cable stored in the optical fiber configuration base member.

5. The access control device of claim 1, wherein
   the optical fiber configuration base member has an outer rectangular shape and an inner rectangular shape, and
   the outer rectangular shape is configured to match and fit within a housing.

6. The access control device of claim 1, wherein the component platform is configured to pivot in one direction, which is the z-direction.

7. The access control device of claim 1, wherein the optical fiber component is an ONU mini node for mounting at a site of a residence, and the ONU mini node is mounted such that optical ports of the ONU mini node are arranged to face downward.

8. The access control device of claim 7, wherein the pivotable component platform is configured to be attached to the optical fiber configuration base member, and is configured to pivot relative to the optical fiber configuration base member.

9. The access control device of claim 1, wherein a kickstand for the pivotable component platform is provided in the optical fiber configuration base member, the kickstand including a latching mechanism configured to permit the kickstand to engage with the pivotable component platform so that the platform rests in a testing/cleaning configuration.

10. The access control device of claim 1, further comprising:
    a first housing portion; and
    a second housing portion configured to be pivotally coupled to the first housing portion, the first housing portion and the second housing portion being configured to cooperate to define an enclosure having a cavity, the second housing portion being configured to pivot relative to the first housing portion between an open configuration providing access to the cavity and a closed configuration preventing access to the cavity.

11. The access control device of claim 1, wherein the access control panel member is configured to be pivotally coupled to the optical fiber configuration base member so as to pivot between the first access position, where the operator is permitted to access the coaxial cable component and not permitted to access the optical fiber component, and a second access position, where an operator is permitted to access the optical fiber component without having to decouple the coaxial cable component from the coaxial cable.

12. The access control device of claim 11, wherein the second access position only occurs after the first access position occurs.

13. The access control device of claim 11, wherein the pivot axis of the access control panel member is offset from a face surface of the access control panel member to allow: (i) an RF input cable to bend freely from one side of the access control panel member to the other side of the access control panel member, and (ii) signal splitting RF output cables that exit from the RF system component to remain connected to the RF cable component and exit through apertures in the first housing portion, when the access control panel member pivots from the first access position to the second access position.

14. An access control device comprising:
a configuration base member configured to be coupled to a first type of telecommunications system component and to arrange the first type of telecommunications system component so as to create a peripheral cable path around at least a portion of the first type of telecommunications system component; and
a component platform configured to be pivotally connected to the configuration base member, the component platform being configured to have the first type of telecommunications system component mounted thereto, such that the first type of telecommunications system component pivots with the component platform; and
an access control panel member configured to be coupled to a radio frequency (RF) cable component, the RF cable component being configured to be coupled to one or more RF cables,
wherein the access control panel, when in a first access position, blocks access to the optical fiber component, while providing an operator access to the RF cable component,
wherein the component platform is connected to the configuration base member via a connection portion that permits the component platform to pivot to a configuration such that the component platform is tilted away from the base member, and
wherein the first type of telecommunications system component is mounted to a side of the component platform facing away from the wall of the configuration base member.

15. The access control device of claim 14, wherein the peripheral cable path is configured to receive slack cable, encircle the slack cable around a portion of the first type of telecommunications system component, and shape the slack cable so as to be connected to the first type of telecommunications system component while preventing the slack cable from being less than a minimum optical fiber bend radius of the slack cable when the slack cable is connected to the first type of telecommunications system component.

16. The access control device of claim 15, wherein the slack cable wraps around at least three quarters of the first type of telecommunications system component within the configuration base member.

17. The access control device of claim 15, further comprising wrap guides configured to extend from the configuration base member so as to control the bend radius of the slack cable stored in the configuration base member.

18. The access control device of claim 14, wherein
the configuration base member has an outer rectangular shape and an inner rectangular shape, and
the outer rectangular shape is configured to match and fit within a housing.

19. The access control device of claim 14, wherein the component platform is configured to pivot in one direction, which is the z-direction.

20. The access control device of claim 14, wherein the first type of telecommunications system is an ONU mini node for mounting at a site of a residence, and the ONU mini node is mounted such that optical ports of the ONU mini node are arranged to face downward.

21. The access control device of claim 20, wherein the pivotable component platform is configured to be attached to the configuration base member, and is configured to pivot relative to the configuration base member.

22. The access control device of claim 14, wherein a kickstand for the pivotable component platform is provided in the configuration base member, the kickstand including a latching mechanism configured to permit the kickstand to engage with the component platform so that the platform rests in a testing/cleaning configuration.

23. The access control device of claim 14, further comprising:
a first housing portion; and
a second housing portion configured to be pivotally coupled to the first housing portion, the first housing portion and the second housing portion being configured to cooperate to define an enclosure having a cavity, the second housing portion being configured to pivot relative to the first housing portion between an open configuration providing access to the cavity and a closed configuration preventing access to the cavity.

24. The access control device of claim 14, wherein the access control panel member is configured to be pivotally coupled to the configuration base member so as to pivot between the first access position, where the operator is permitted to access the second type of telecommunications system component and not permitted to access the first type of telecommunications system component, and a second access position, where an operator is permitted to access the first type of telecommunications system component without having to de-couple the second type of telecommunications system component from the cable.

25. The access control device of claim 24, wherein the second access position only occurs after the first access position occurs.

26. The access control device of claim 24, wherein the pivot axis of the access control panel member is offset from a face surface of the access control panel member to allow: (i) an input cable to bend freely from one side of the access control panel member to the other side of the access control panel member, and (ii) signal splitting cables that exit from the second type of telecommunications system component to remain connected to the second type of telecommunications system component and exit through apertures in the first housing portion, when the access control panel member pivots from the first access position to the second access position.

27. An access control device comprising:
a first housing portion having a back wall and a side wall extending from the back wall;
a second housing portion coupled to the first housing portion, the first housing portion and the second housing portion cooperating to define an enclosure having a cavity, the second housing portion being movable relative to the first housing portion between an open configuration providing access to the cavity and a closed configuration preventing access to the cavity;
a compartment panel disposed in the cavity and being coupled to the first housing portion, the compartment panel being movable relative to the first housing portion between a closed position and an open position; and
a component platform configured to be pivotally connected to the back wall of the first housing portion, wherein
when the first housing portion is in the open configuration and the compartment panel is in the closed position, the compartment panel divides the cavity into a first compartment configured to house a first telecommunications system component therein and a second compartment configured to house a second telecommunications system component therein, the first compartment being closed to block access to the first telecommunications system component, and the second compartment being open such that the second telecommunications system component is accessible to the user, the second type of telecommunications component is mounted to and movable with the compartment panel, the side wall of the first housing portion has at least one aperture configured to accommodate passage of a first cable, which is connected to the first telecommunications system component, from the first compartment to an exterior of the telecommunications box, the compartment panel has an opening at a first end thereof, the first end of the compartment panel being adjacent to the side wall of the first housing portion, the opening being configured to accommodate passage of a second cable, which is connected to the first telecommunications system component and the second telecommunications system component, from the first compartment to the second compartment, when the first housing portion and the second housing portion are in the open configuration and the compartment panel is in the open position, the second compartment and the second telecommunications system component are accessible to the user, the compartment panel is configured to be moved between the closed position and the open position while the first cable and the second cable remain connected to the first telecommunications system component and while the second cable remains connected to the second telecommunications system component, and the component platform is configured to be pivotally connected to the back wall of the first housing portion or a base member that is attached to the back wall via a connection portion that allows the component platform to pivot to a configuration such that the component platform is tilted away from the base member.

* * * * *